US012143674B2

(12) United States Patent
Irie et al.

(10) Patent No.: US 12,143,674 B2
(45) Date of Patent: Nov. 12, 2024

(54) INFORMATION PROCESSING APPARATUS, INFORMATION PROCESSING METHOD, AND PROGRAM

(71) Applicant: FUJIFILM Corporation, Tokyo (JP)

(72) Inventors: Fuminori Irie, Saitama (JP); Takashi Aoki, Saitama (JP); Kazunori Tamura, Saitama (JP); Masahiko Miyata, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/844,039

(22) Filed: Jun. 19, 2022

(65) Prior Publication Data
US 2022/0329912 A1 Oct. 13, 2022

Related U.S. Application Data

(63) Continuation of application No. PCT/JP2020/042159, filed on Nov. 11, 2020.

(30) Foreign Application Priority Data

Dec. 26, 2019 (JP) ................. 2019-237490

(51) Int. Cl.
*H04N 21/472* (2011.01)
*G06T 7/00* (2017.01)
*H04N 21/44* (2011.01)

(52) U.S. Cl.
CPC ..... *H04N 21/47217* (2013.01); *G06T 7/0002* (2013.01); *H04N 21/44008* (2013.01)

(58) Field of Classification Search
CPC ........ H04N 21/47217; H04N 21/44008; G06T 7/0002
See application file for complete search history.

(56) References Cited

U.S. PATENT DOCUMENTS

| 2018/0048810 | A1* | 2/2018 | Matsushita | .......... H04N 13/243 |
| 2018/0182114 | A1* | 6/2018 | Hanamoto | ................ G06T 7/55 |
| 2018/0359458 | A1* | 12/2018 | Iwakiri | .................. G06T 15/205 |
| 2019/0012825 | A1 | 1/2019 | Maruyama et al. | |

(Continued)

FOREIGN PATENT DOCUMENTS

| JP | 2006166255 | 6/2006 |
| JP | 2018206025 | 12/2018 |

(Continued)

OTHER PUBLICATIONS

"International Search Report (Form PCT/ISA/210) of PCT/JP2020/042159," mailed on Jan. 26, 2021, with English translation thereof, pp. 1-5.

(Continued)

*Primary Examiner* — Mulugeta Mengesha
(74) *Attorney, Agent, or Firm* — JCIPRNET

(57) ABSTRACT

An information processing apparatus includes a processor and a memory connected to or incorporated in the processor. The processor acquires viewpoint information regarding at least one virtual viewpoint, and presents quality information indicating a quality of a virtual viewpoint video that is creatable with the viewpoint information as a reference, on the basis of a plurality of motion picture data obtained by being captured by a plurality of imaging devices.

17 Claims, 21 Drawing Sheets

(56) References Cited

U.S. PATENT DOCUMENTS

| | | | |
|---|---|---|---|
| 2019/0075332 A1 | 3/2019 | Onuma | |
| 2019/0158802 A1* | 5/2019 | Higuchi | G06V 20/46 |
| 2019/0163356 A1 | 5/2019 | Hanamoto | |
| 2019/0253639 A1* | 8/2019 | Takama | G06T 15/20 |
| 2020/0245003 A1 | 7/2020 | Onuma | |
| 2021/0065746 A1 | 3/2021 | Sugano et al. | |
| 2021/0297746 A1 | 9/2021 | Katsumata et al. | |

FOREIGN PATENT DOCUMENTS

| | | |
|---|---|---|
| JP | 2019016862 | 1/2019 |
| JP | 2019020845 | 2/2019 |
| JP | 2019047432 | 3/2019 |
| JP | 2019102907 | 6/2019 |
| JP | 2019118040 | 7/2019 |
| WO | 2018066381 | 4/2018 |

OTHER PUBLICATIONS

"Written Opinion of the International Searching Authority (Form PCT/ISA/237)" of PCT/JP2020/042159, mailed on Jan. 26, 2021, with English translation thereof, pp. 1-10.
"Office Action of Japan Counterpart Application", issued on Jun. 6, 2023, with English translation thereof, pp. 1-8.

* cited by examiner

INFORMATION PROCESSING APPARATUS, INFORMATION PROCESSING METHOD, AND PROGRAM

CROSS-REFERENCE TO RELATED APPLICATION

This application is a continuation application of International Application No. PCT/JP2020/042159, filed Nov. 11, 2020, the disclosure of which is incorporated herein by reference in its entirety. Further, this application claims priority from Japanese Patent Application No. 2019-237490 filed on Dec. 26, 2019, the disclosure of which is incorporated herein by reference in its entirety.

BACKGROUND

1. Technical Field

A technique of the present disclosure relates to an information processing apparatus, an information processing method, and a program.

2. Description of the Related Art

JP2019-47432A discloses an information processing apparatus. The information processing apparatus disclosed in JP2019-47432A acquires information regarding a time point associated with material data used to generate a content, specifies a valid time range in which the material data used to generate the content exists on the basis of the acquired information, and outputs information indicating the specified valid time range.

JP2019-102907A discloses a setting apparatus. The setting apparatus receives a user operation related to a setting of a first parameter related to a position and an orientation of a virtual viewpoint, decides a settable range of a second parameter related to the virtual viewpoint on the basis of the first parameter, and sets the first parameter and the second parameter of the settable range, as parameters related to the virtual viewpoint.

JP2019-16862A discloses an information processing apparatus including a receiving unit that receives a type of event in an imaging target region, and a restriction unit that restricts generation of a virtual viewpoint image by referring to a restriction content related to the generation of the virtual viewpoint image, which is determined for the imaging target region, and a restriction content related to the generation of the virtual viewpoint image, which is determined for the type of event of an imaging target.

WO2018/066381A discloses a reproduction device. A reproduction processing unit performs processing of reproducing a plurality of types of moving image contents in reproduction modes corresponding to the respective moving image contents. A user interface display processing unit performs processing of displaying a user interface indicating at least one of a type or a reproduction mode of the moving image content being reproduced. The technique of WO2018/066381A is applicable to, for example, a reproduction device capable of reproducing a 2D moving image content, a full spherical moving image content, and a free viewpoint moving image content.

JP2019-118040A discloses a medical motion picture processing system. The medical motion picture processing system comprises an encoder by which a plurality of motion picture files related to a surgical operation are divided into a plurality of input systems and are input; a server apparatus that stores the plurality of motion picture files in association with a common time code; and a viewing terminal apparatus that displays the plurality of motion picture files and information regarding the motion picture files, in which the viewing terminal apparatus divides a plurality of timelines related to the plurality of motion picture files for each input system and displays the plurality of timelines, and synchronously displays, among images included in the plurality of motion picture files corresponding to the displayed timeline, at least a part of a plurality of images associated with a time code of a certain time point included in the timeline, and receives an operation input of a user to execute editing processing for motion picture files synchronously displayed in a synchronous display region.

SUMMARY

One embodiment according to the technique of the present disclosure provides an information processing apparatus, an information processing method, and a program capable of supporting editing of a virtual viewpoint video.

A first aspect according to the technique of the present disclosure is an information processing apparatus comprising: a processor; and a memory that is connected to or incorporated in the processor, in which the processor acquires viewpoint information regarding at least one virtual viewpoint, and presents quality information indicating a quality of a virtual viewpoint video that is creatable with the viewpoint information as a reference, on the basis of a plurality of motion picture data obtained by being captured by a plurality of imaging devices.

A second aspect according to the technique of the present disclosure is the information processing apparatus according to the first aspect, in which the processor presents the quality information in association with a period of imaging performed by the plurality of imaging devices.

A third aspect according to the technique of the present disclosure is the information processing apparatus according to the first or second aspect, in which the viewpoint information includes a position, a line-of-sight direction, and an angle of view of the virtual viewpoint, the quality is a value related to a proportion of an occlusion region of a specific subject included in a visual field range decided by the viewpoint information, and the processor determines that the smaller the proportion of the occlusion region is, the higher the quality is.

A fourth aspect according to the technique of the present disclosure is the information processing apparatus according to the third aspect, in which the processor changes a presentation mode according to the proportion of the occlusion region.

A fifth aspect according to the technique of the present disclosure is the information processing apparatus according to the fourth aspect, in which the presentation mode is a mode displayed by control of a display performed by the processor.

A sixth aspect according to the technique of the present disclosure is the information processing apparatus according to the first or second aspect, in which the viewpoint information includes a position, a line-of-sight direction, and an angle of view of the virtual viewpoint, the quality is a value related to the number of pixels of or a degree of focusing on a specific subject included in a visual field range decided by the viewpoint information, and the processor determines that the greater the number of pixels is or the higher the degree of focusing is, the higher the quality is.

A seventh aspect according to the technique of the present disclosure is the information processing apparatus according to any one of the first to sixth aspects, in which the processor presents at least one of a time slot in which the quality is a threshold value or more or a time slot in which the quality is less than the threshold value, as the quality information.

An eighth aspect according to the technique of the present disclosure is the information processing apparatus according to the seventh aspect, in which the processor distinguishes and presents the time slot in which the quality is the threshold value or more and the time slot in which the quality is less than the threshold value, as the quality information.

A ninth aspect according to the technique of the present disclosure is the information processing apparatus according to the seventh or eighth aspect, in which the processor changes the threshold value according to a reproduction speed of a motion picture file created by editing the virtual viewpoint video.

A tenth aspect according to the technique of the present disclosure is the information processing apparatus according to the ninth aspect, in which the processor lowers the threshold value as the reproduction speed increases.

An eleventh aspect according to the technique of the present disclosure is the information processing apparatus according to any one of the seventh to tenth aspects, in which the processor has a plurality of the threshold values, and presents at least one of the time slot in which the quality is the threshold value or more or the time slot in which the quality is less than the threshold value, for each threshold value.

A twelfth aspect according to the technique of the present disclosure is the information processing apparatus according to any one of the first to eleventh aspects, in which the viewpoint information includes a plurality of virtual viewpoints, and the processor presents the quality information for each virtual viewpoint.

A thirteenth aspect according to the technique of the present disclosure is the information processing apparatus according to any one of the first to twelfth aspects, in which the viewpoint information includes a trajectory indicating a temporal movement of one virtual viewpoint, and the processor presents quality information indicating a quality of a virtual viewpoint video that is creatable from a position of each virtual viewpoint constituting the trajectory.

A fourteenth aspect according to the technique of the present disclosure is the information processing apparatus according to any one of the first to thirteenth aspects, in which the processor acquires viewpoint information regarding at least one virtual viewpoint designated by a reception device.

A fifteenth aspect according to the technique of the present disclosure is the information processing apparatus according to any one of the first to thirteenth aspects, in which the processor acquires viewpoint information regarding at least one virtual viewpoint set on the basis of at least one motion picture data among the plurality of motion picture data.

A sixteenth aspect according to the technique of the present disclosure is an information processing method comprising: acquiring viewpoint information regarding at least one virtual viewpoint; and presenting quality information indicating a quality of a virtual viewpoint video that is creatable with the viewpoint information as a reference, on the basis of a plurality of motion picture data obtained by being captured by a plurality of imaging devices.

A seventeenth aspect according to the technique of the present disclosure is a program for causing a computer to execute a process comprising: acquiring viewpoint information regarding at least one virtual viewpoint; and presenting quality information indicating a quality of a virtual viewpoint video that is creatable with the viewpoint information as a reference, on the basis of a plurality of motion picture data obtained by being captured by a plurality of imaging devices.

BRIEF DESCRIPTION OF THE DRAWINGS

Exemplary embodiments according to the technique of the present disclosure will be described in detail based on the following figures, wherein.

DETAILED DESCRIPTION

An example of embodiments according to the technique of the present disclosure will be described with reference to the accompanying drawings.

First, the wording used in the following description will be described.

CPU is an abbreviation of "central processing unit". RAM is an abbreviation of "random access memory". DRAM is an abbreviation of "dynamic random access memory". SRAM is an abbreviation of "static random access memory". ROM is an abbreviation of "read only memory". SSD is an abbreviation of "solid state drive". HDD is an abbreviation of "hard disk drive". EEPROM is an abbreviation of "electrically erasable and programmable read only memory". I/F is an abbreviation of "interface". IC is an abbreviation of "integrated circuit". ASIC is an abbreviation of "application specific integrated circuit". PLD is an abbreviation of "programmable logic device". FPGA is an abbreviation of "field-programmable gate array". SoC is an abbreviation of "system-on-a-chip". CMOS is an abbreviation of "complementary metal oxide semiconductor". CCD is an abbreviation of "charge coupled device". EL is an abbreviation of "electro-luminescence". GPU is an abbreviation of "graphics processing unit". LAN is an abbreviation of "local area network". 3D is an abbreviation of "3 dimension". USB is an abbreviation of "Universal Serial Bus". "HMD" is an abbreviation of "head mounted display". GUI is an abbreviation of "graphical user interface". LTE is an abbreviation of "Long Term Evolution". 5G is an abbreviation of "5th generation (wireless technology for digital cellular networks)". TDM is an abbreviation of "time-division multiplexing". In addition, in the description of the present specification, the meaning of "match" includes not only the meaning of complete match but also the meaning of substantial match including errors allowed in design and manufacturing.

Figure 1:
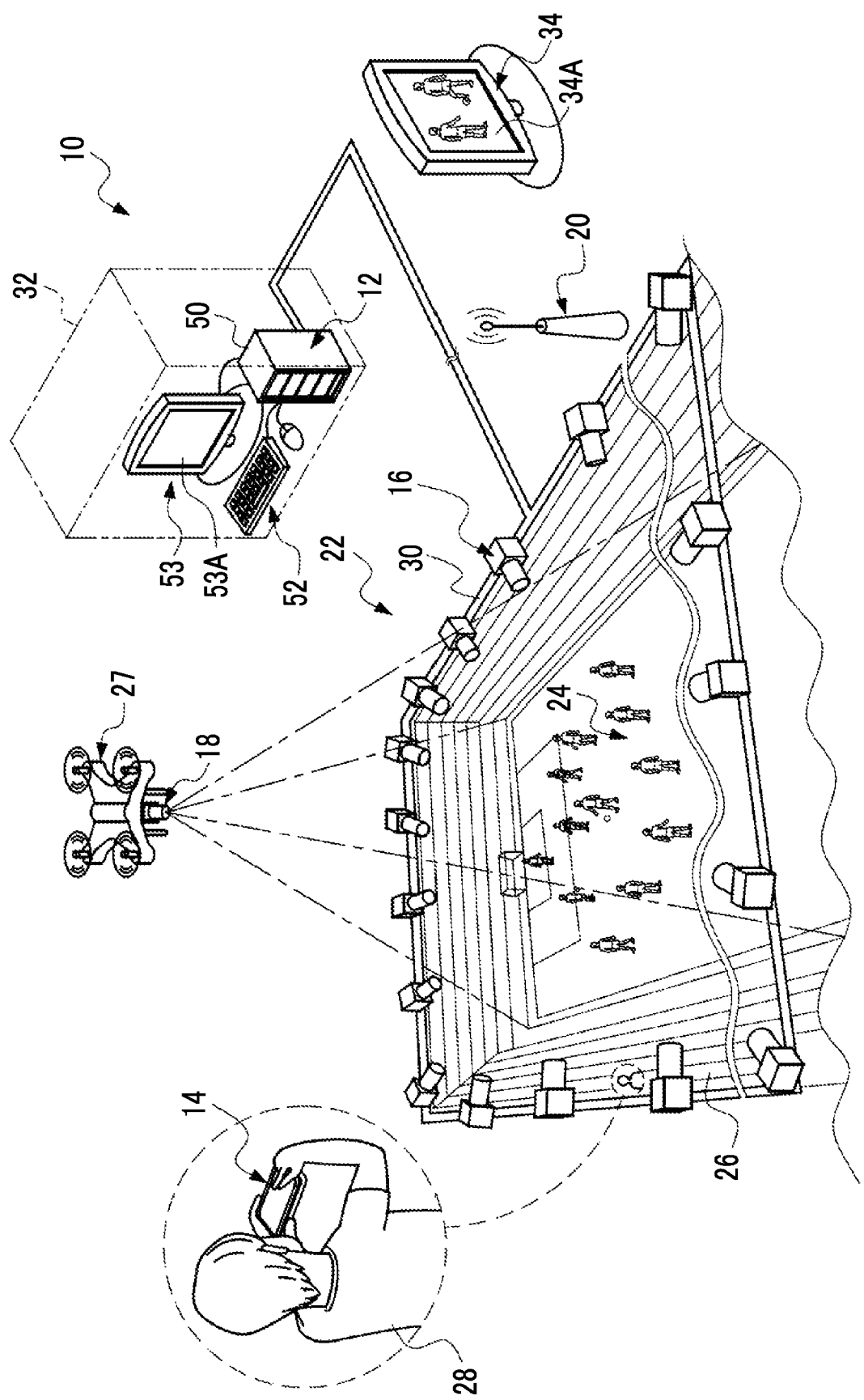
FIG. 1 is a schematic perspective view showing an example of an external configuration of an information processing system.

As shown in FIG. 1 as an example, an information processing system 10 comprises an information processing apparatus 12, a smart device 14, a plurality of imaging devices 16, an imaging device 18, a wireless communication base station (hereinafter, simply referred to as a "base station") 20, and a receiver 34. Here, the "smart device 14" refers to, for example, a portable multifunctional terminal, such as a smartphone, a tablet terminal, a smart watch (watch-type multifunctional terminal), and an HMD-type multifunctional terminal. Here, the receiver 34 is described as an example, but the technique of the present disclosure is not limited thereto, and the receiver 34 may be an electronic device with a display (for example, a smart device). In addition, the number of the base stations 20 is not limited to one, and a plurality of base stations 20 may exist. Further, the communication standards used in the base station include a wireless communication standard including a 5G standard, an LTE standard, and the like, a wireless communication standard including a WiFi (802.11) standard and/or a Bluetooth (registered trademark) standard, and a wired communication standard including a TDM standard and/or an Ethernet (registered trademark) standard.

The imaging devices 16 and 18 each are a device for imaging having a CMOS image sensor, and are equipped with an optical zoom function and/or a digital zoom function. Another type of image sensor, such as a CCD image sensor, may be adopted instead of the CMOS image sensor. Hereinafter, for convenience of description, in a case where it is not necessary to distinguish between the imaging device 18 and the plurality of imaging devices 16 in the description, the imaging device 18 and the plurality of imaging devices 16 will be referred to as a "plurality of imaging devices" without reference numerals.

The plurality of imaging devices 16 are installed in a soccer stadium 22. Each of the plurality of imaging devices 16 is disposed so as to surround a soccer field 24, and images a region including the soccer field 24 as an imaging region. Here, a description is given using, as an example, an aspect in which each of the plurality of imaging devices 16 is disposed so as to surround the soccer field 24, but the technique of the present disclosure is not limited thereto, and the disposition of the plurality of imaging devices 16 is decided according to a virtual viewpoint video requested to be generated by the viewer 28 or the like. The plurality of imaging devices 16 may be disposed so as to surround the entire soccer field 24, or the plurality of imaging devices 16 may be disposed so as to surround a specific part thereof. The imaging device 18 is installed in an unmanned aerial vehicle (for example, a multi-rotorcraft unmanned aerial vehicle), and images a bird's-eye view of the region including the soccer field 24 from the sky, as the imaging region. The imaging region as the bird's-eye view of the region including the soccer field 24 from the sky refers to a surface imaged by the imaging device 18 with respect to the soccer field 24.

The information processing apparatus 12 is installed in a control room 32. Although details will be described later, the information processing apparatus 12 includes a computer 50, a display 53, and a reception device 52, and a motion picture editing screen 53A is displayed on the display 53. The plurality of imaging devices 16 and the information processing apparatus 12 are connected through a LAN cable 30, and the information processing apparatus 12 controls the plurality of imaging devices 16 and acquires images obtained by being captured by each of the plurality of imaging devices 16. Here, the connection using the wired communication method through the LAN cable 30 is described as an example, but the technique of the present disclosure is not limited thereto, and the connection using the wireless communication method may be applied.

A spectator stand 26 is provided in the soccer stadium 22 so as to surround the soccer field 24, and a viewer 28 is seated in the spectator stand 26. The viewer 28 possesses the smart device 14, and the smart device 14 is used by the viewer 28. Here, a description is given using, as an example, an aspect in which the viewer 28 exists in the soccer stadium 22, but the technique of the present disclosure is not limited thereto, and the viewer 28 may exist outside the soccer stadium 22.

The base station 20 transmits and receives various kinds of information to and from the information processing apparatus 12 and the unmanned aerial vehicle 27 through radio waves. That is, the information processing apparatus 12 is connected to the unmanned aerial vehicle 27 through the base station 20 so as to be capable of wireless communication. The information processing apparatus 12 performs wireless communication with the unmanned aerial vehicle 27 through the base station 20 to control the unmanned aerial vehicle 27 and to acquire images obtained by being captured by the imaging device 18, from the unmanned aerial vehicle 27.

The base station 20 transmits various kinds of information to the receiver 34 through wireless communication. The information processing apparatus 12 transmits various videos to the receiver 34 through the base station 20, and the receiver 34 receives various videos transmitted from the information processing apparatus 12 and displays the received various videos on a screen 34A. The receiver 34 is used, for example, for viewing by an unspecified number of spectators and the like. The location where the receiver 34 is installed may be inside the soccer stadium 22, outside the soccer stadium 22 (for example, a public viewing venue), or the like. Here, a description is given using, as an example, an aspect in which the information processing apparatus 12 transmits various kinds of information to the receiver 34 through wireless communication, but the technique of the present disclosure is not limited thereto, and for example, an aspect in which the information processing apparatus 12 transmits various kinds of information to the receiver 34 through wired communication may be adopted.

The information processing apparatus 12 is a device corresponding to a server, and the smart device 14 is a device corresponding to a client terminal with respect to the information processing apparatus 12. The information processing apparatus 12 and the smart device 14 perform wireless communication with each other through the base station 20, whereby the smart device 14 requests the provision of various services of the information processing apparatus 12 and the information processing apparatus 12 provides the smart device 14 with a service corresponding to the request from the smart device 14.

Figure 2:
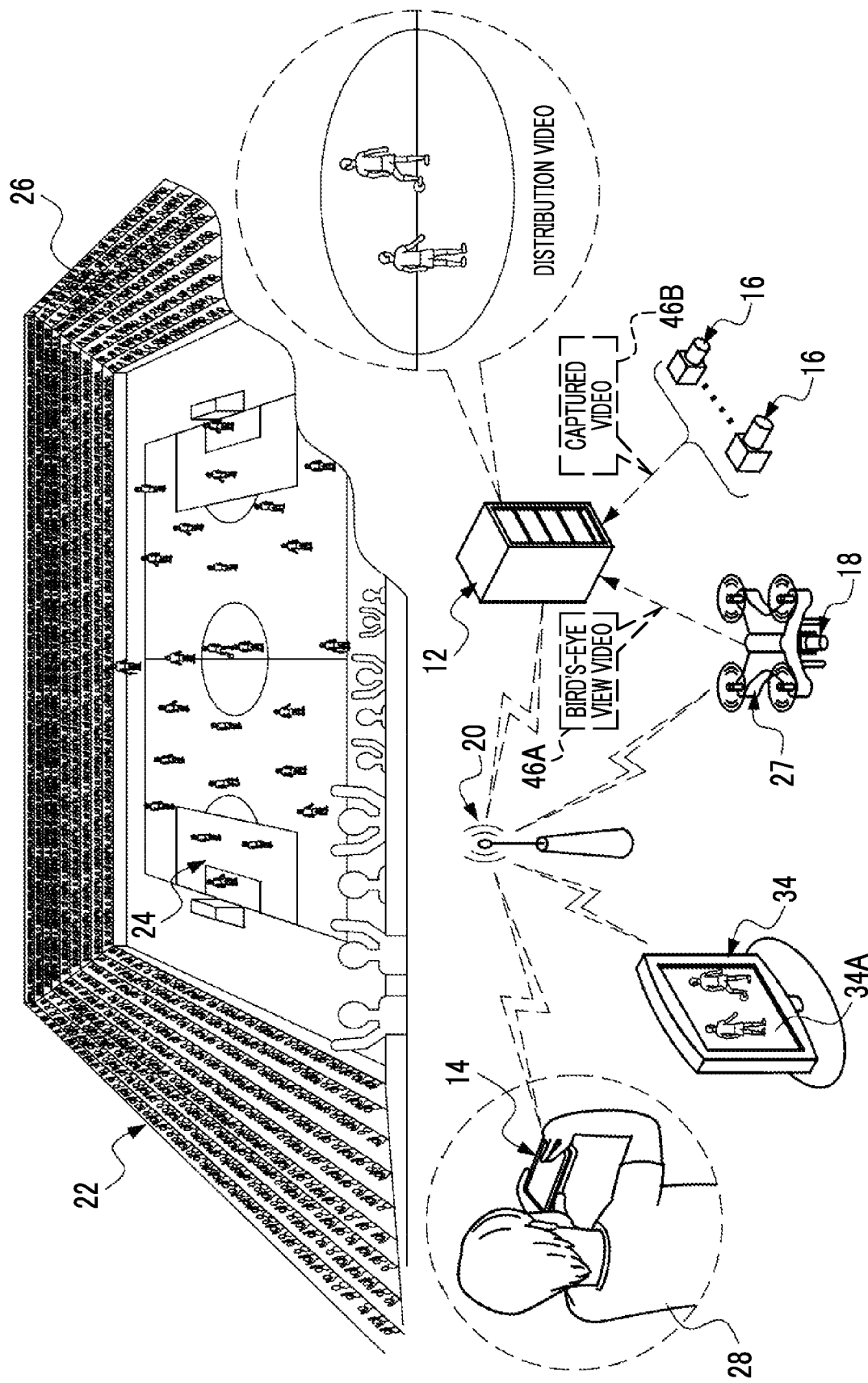
FIG. 2 is a conceptual diagram showing an example of a relationship between an information processing apparatus, a smart device, a receiver, an unmanned aerial vehicle, and an imaging device that are included in the information processing system.

As shown in FIG. 2 as an example, the information processing apparatus 12 acquires, from the unmanned aerial vehicle 27, a bird's-eye view video 46A showing the region including the soccer field 24 as observed from the sky. The bird's-eye view video 46A is a moving image obtained by imaging the bird's-eye view of the region including the soccer field 24 from the sky as the imaging region (hereinafter, also simply referred to as an "imaging region") with the imaging device 18 of the unmanned aerial vehicle 27. The moving image obtained by being captured by the imaging device 18 is an example of "motion picture data" according to the technique of the present disclosure.

The information processing apparatus 12 acquires, from each of the plurality of imaging devices 16, a captured video 46B showing the imaging region as observed from a position of each of the plurality of imaging devices 16. The captured video 46B is a moving image obtained by imaging the imaging region with each of the plurality of imaging devices 16. The moving image obtained by being captured by the imaging device 16 is an example of "motion picture data" according to the technique of the present disclosure.

A user can perform editing work of the virtual viewpoint video by operating the reception device 52 on the basis of the motion picture editing screen 53A displayed on the display 53. With this, the virtual viewpoint video is edited by the information processing apparatus 12, and the edited result is generated as a distribution video.

Figure 3:
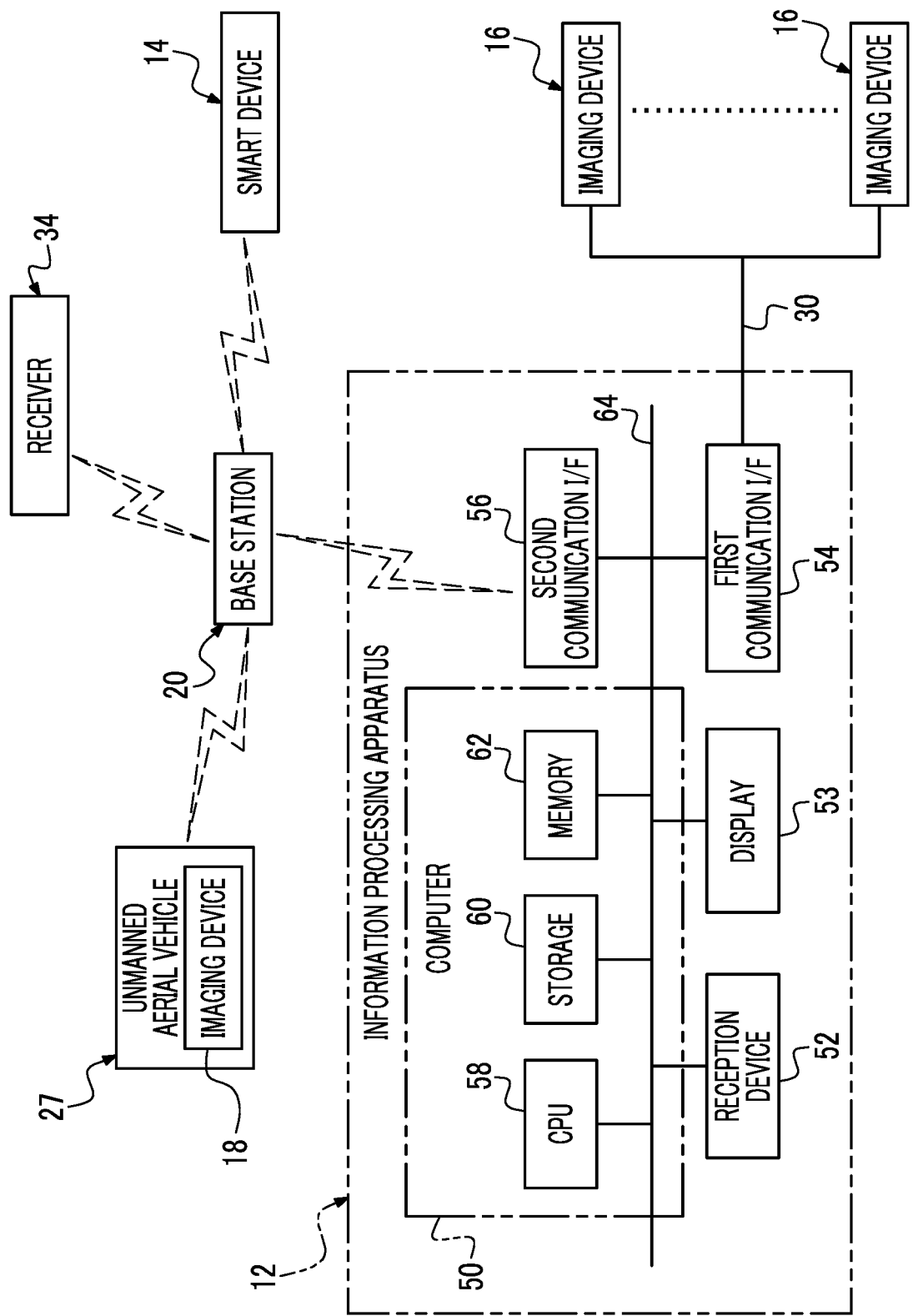
FIG. 3 is a block diagram showing an example of a hardware configuration of an electrical system of the information processing apparatus and an example of a relation between the information processing apparatus and peripheral devices.

As shown in FIG. 3 as an example, the information processing apparatus 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other through a bus 64. In the example shown in FIG. 3, one bus is shown as the bus 64 for convenience of illustration, but a plurality of buses may be used. In addition, the bus 64 may include a serial bus or a parallel bus constituted of a data bus, an address bus, a control bus, and the like.

The CPU 58 controls the entire information processing apparatus 12. The storage 60 stores various parameters and various programs. The storage 60 is a non-volatile storage device. Here, a flash memory is adopted as an example of the storage 60, but the technique of the present disclosure is not limited thereto, and an EEPROM, an HDD, an SSD, or the like may be adopted. The memory 62 is a storage device. The memory 62 temporarily stores various kinds of information. The memory 62 is used as a work memory by the CPU 58. Here, a DRAM is adopted as an example of the memory 62, but the technique of the present disclosure is not limited thereto, and another type of storage device may be adopted. The CPU 58 is an example of the "processor" according to the technique of the present disclosure. Further, the storage 60 and the memory 62 are an example of the "memory" according to the technique of the present disclosure.

The reception device 52 receives an instruction from a user or the like of the information processing apparatus 12. An example of the reception device 52 includes a keyboard, a touch panel, and a mouse. The reception device 52 is connected to the bus 64 or the like, and the instruction received by the reception device 52 is acquired by the CPU 58.

The display 53 is connected to the bus 64 and displays various kinds of information under the control of the CPU 58. An example of the display 53 includes a liquid crystal display. The technique of the present disclosure is not limited to the liquid crystal display, another type of display, such as an organic EL display, may be adopted as the display 53.

The first communication I/F 54 is connected to the LAN cable 30. The first communication I/F 54 is realized by, for example, a device having an FPGA. The first communication I/F 54 is connected to the bus 64 and takes charge of the exchange of various kinds of information between the CPU 58 and the plurality of imaging devices 16. For example, the first communication I/F 54 controls the plurality of imaging devices 16 in accordance with the request of the CPU 58. Further, the first communication I/F 54 outputs the captured video 46B (see FIG. 2) obtained by being captured by each of the plurality of imaging devices 16 to the CPU 58. Here, the first communication I/F 54 is described as an example of a wired communication I/F, but a wireless communication I/F, such as a high-speed wireless LAN, may be used.

The second communication I/F 56 is connected to the base station 20 so as to be capable of wireless communication. The second communication I/F 56 is realized, for example, by a device having an FPGA. The second communication I/F 56 is connected to the bus 64. The second communication I/F 56 takes charge of the exchange of various kinds of information between the CPU 58 and the unmanned aerial vehicle 27 in a wireless communication method, through the base station 20. In addition, the second communication I/F 56 takes charge of the exchange of various kinds of information between the CPU 58 and the smart device 14 in a wireless communication method, through the base station 20. Further, the second communication I/F 56 takes charge of the transmission of various videos to the receiver 34, which is performed by the CPU 58, in a wireless communication method, through the base station 20. At least one of the first communication I/F 54 or the second communication I/F 56 can be constituted of a fixing circuit instead of an FPGA. Alternatively, at least one of the first communication I/F 54 or the second communication I/F 56 may be a circuit constituted of, for example, an ASIC, an FPGA, and/or a PLD.

Figure 4:
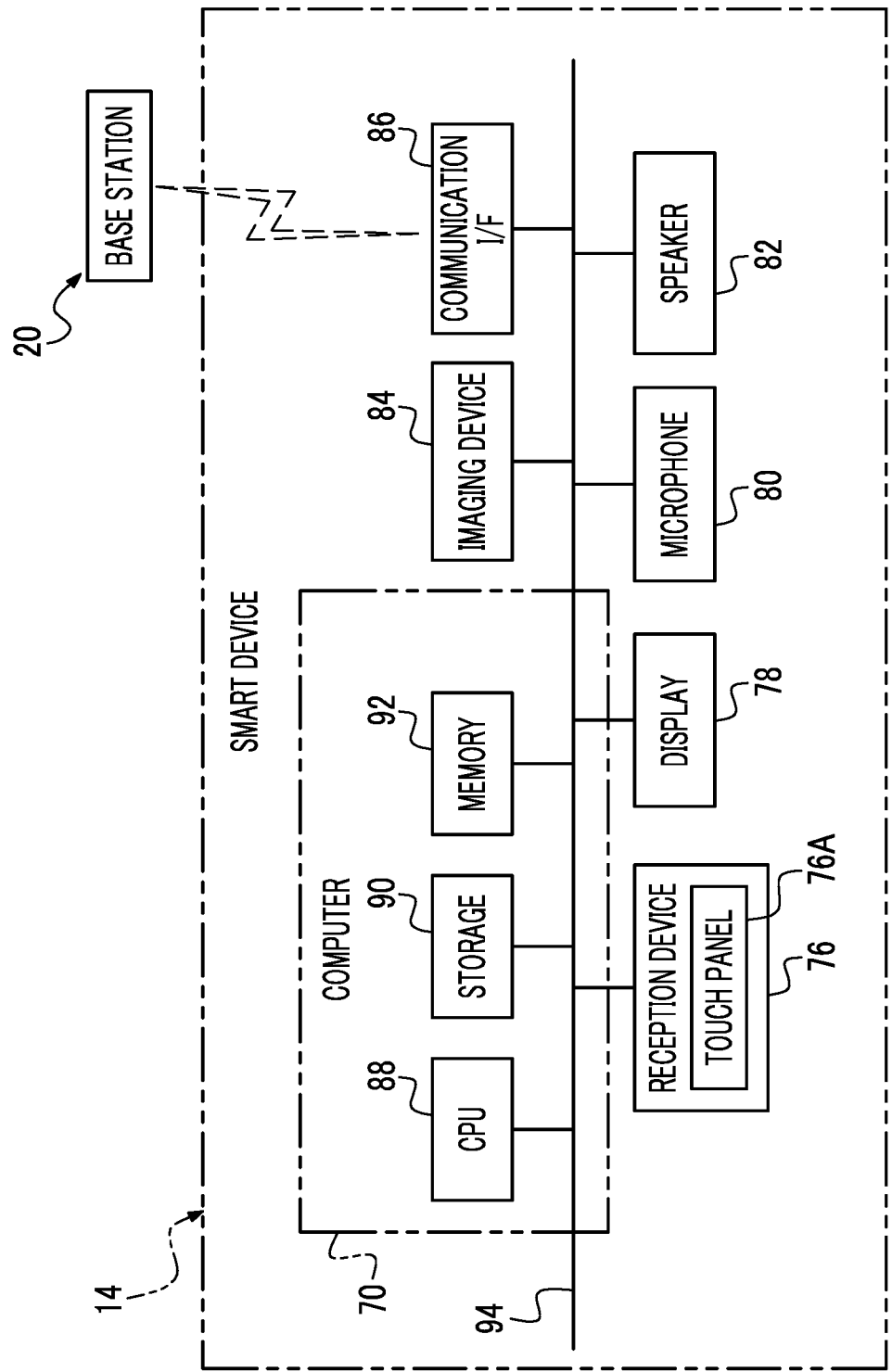
FIG. 4 is a block diagram showing an example of a hardware configuration of an electrical system of the smart device.

As shown in FIG. 4 as an example, the smart device 14 comprises a computer 70, a reception device 76, a display 78, a microphone 80, a speaker 82, an imaging device 84, and a communication I/F 86. The computer 70 comprises a CPU 88, a storage 90, and a memory 92, and the CPU 88, the storage 90, and the memory 92 are connected to each other through a bus 94. In the example shown in FIG. 4, one bus is shown as the bus 94 for convenience of illustration, but the bus 94 may be a plurality of buses. The bus 94 may be a serial bus or a parallel bus including a data bus, an address bus, a control bus, and the like.

The CPU 88 controls the entire smart device 14. The storage 90 stores various parameters and various programs. The storage 90 is a non-volatile storage device. Here, a flash memory is adopted as an example of the storage 90. The flash memory is merely an example, and examples of the storage 90 include various non-volatile memories, such as a magnetoresistive memory and/or a ferroelectric memory, instead of the flash memory or in combination with the flash memory. Further, the non-volatile storage device may be, for example, an EEPROM, an HDD, and/or an SSD. The memory 92 temporarily stores various kinds of information and is used as a work memory by the CPU 88. An example of the memory 92 includes a RAM, but the technique of the present disclosure is not limited thereto, and another type of storage device may be used.

The reception device 76 receives an instruction from a user or the like (here, as an example, the viewer 28) of the smart device 14. An example of the reception device 76 includes a touch panel 76A and a hard key. The reception device 76 is connected to the bus 94, and the instruction received by the reception device 76 is acquired by the CPU 88.

The display 78 is connected to the bus 94 and displays various kinds of information under the control of the CPU 88. An example of the display 78 includes a liquid crystal display. The technique of the present disclosure is not limited to the liquid crystal display, another type of display, such as an organic EL display, may be adopted as the display 78.

The smart device 14 comprises a touch panel/display, and the touch panel/display is realized by the touch panel 76A and the display 78. That is, the touch panel/display is formed by overlapping the touch panel 76A with the display region of the display 78 or by incorporating the touch panel function inside the display 78 ("in-cell" type).

The microphone 80 converts collected sound into an electrical signal. The microphone 80 is connected to the bus 94. The electrical signal obtained by converting the collected sound with the microphone 80 is acquired by the CPU 88 through the bus 94.

The speaker 82 converts the electrical signal into sound. The speaker 82 is connected to the bus 94. The speaker 82 receives the electrical signal output from the CPU 88 through the bus 94, converts the received electrical signal into sound, and outputs the sound obtained by converting the electrical signal, to the outside of the smart device 14.

The imaging device 84 images the subject to acquire an image showing the subject. The imaging device 84 is connected to the bus 94. The image obtained by imaging the subject with the imaging device 84 is acquired by the CPU 88 through the bus 94.

The communication I/F 86 is connected to the base station 20 so as to be capable of wireless communication. The communication I/F 86 is realized, for example, by a device constituted of a circuit (for example, an ASIC, an FPGA, and/or PLD). The communication I/F 86 is connected to the bus 94. The communication I/F 86 takes charge of the exchange of various kinds of information between the CPU 88 and the external device in a wireless communication method, through the base station 20. Here, examples of the "external device" include the information processing apparatus 12.

Figure 5:
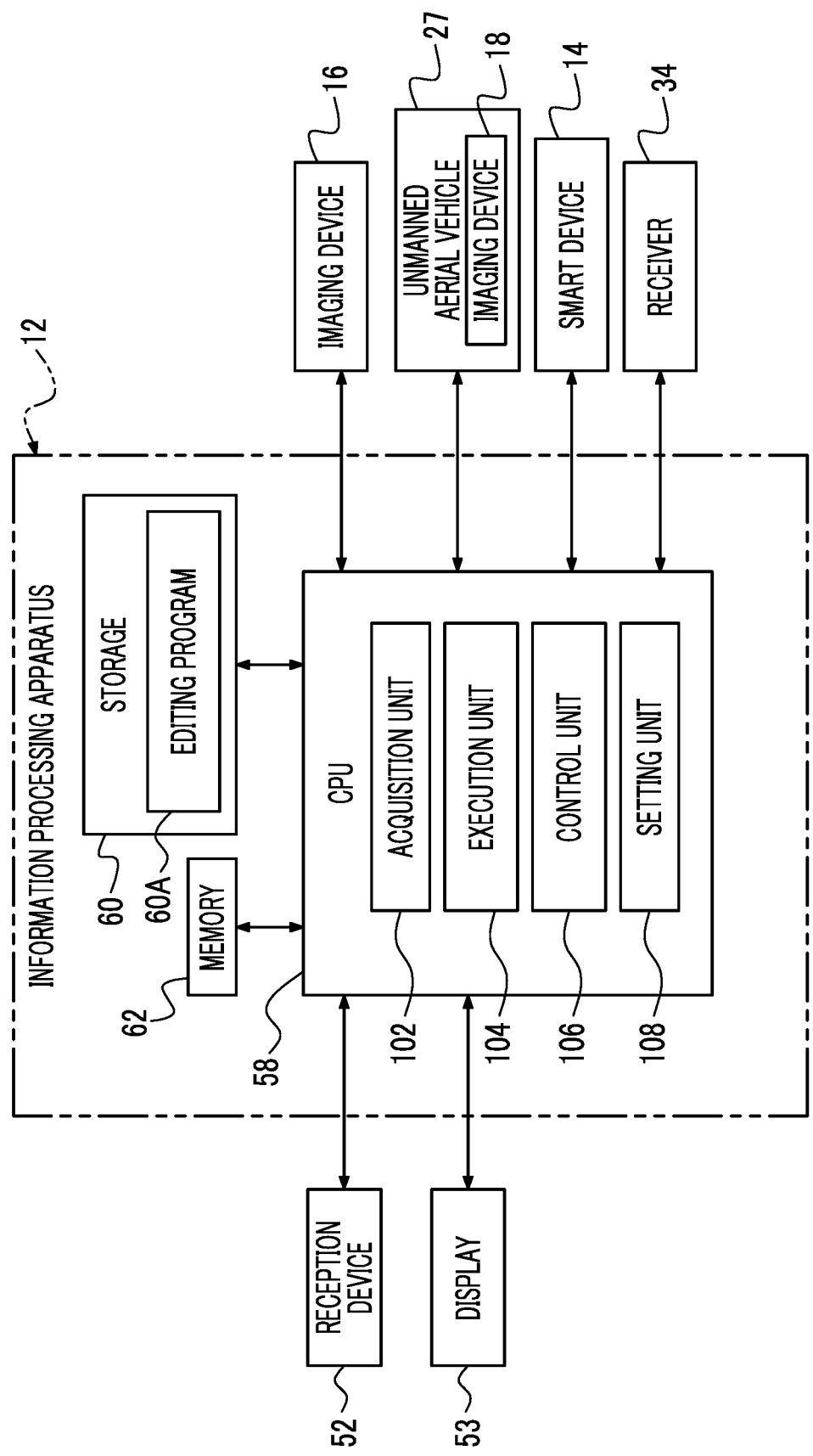
FIG. 5 is a block diagram showing an example of functions of main units of the information processing apparatus.

As shown in FIG. 5 as an example, in the information processing apparatus 12, the storage 60 stores an editing program 60A. The CPU 58 reads out the editing program 60A from the storage 60, and executes the read-out editing program 60A on the memory 62. The CPU 58 exchanges various kinds of information between the smart device 14, the imaging device 16, and the unmanned aerial vehicle 27 in accordance with the editing program 60A executed on the memory 62, and transmits various videos to the receiver 34. The editing program 60A is a program for causing the computer 50 to execute processing, and is an example of the "program" according to the technique of the present disclosure.

The CPU 58 reads out the editing program 60A from the storage 60, and executes the read-out editing program 60A on the memory 62. The CPU 58 operates as an acquisition unit 102, an execution unit 104, a control unit 106, and a setting unit 108 in accordance with the editing program 60A executed on the memory 62 to execute various kinds of information processing, which will be described later.

Figure 6:
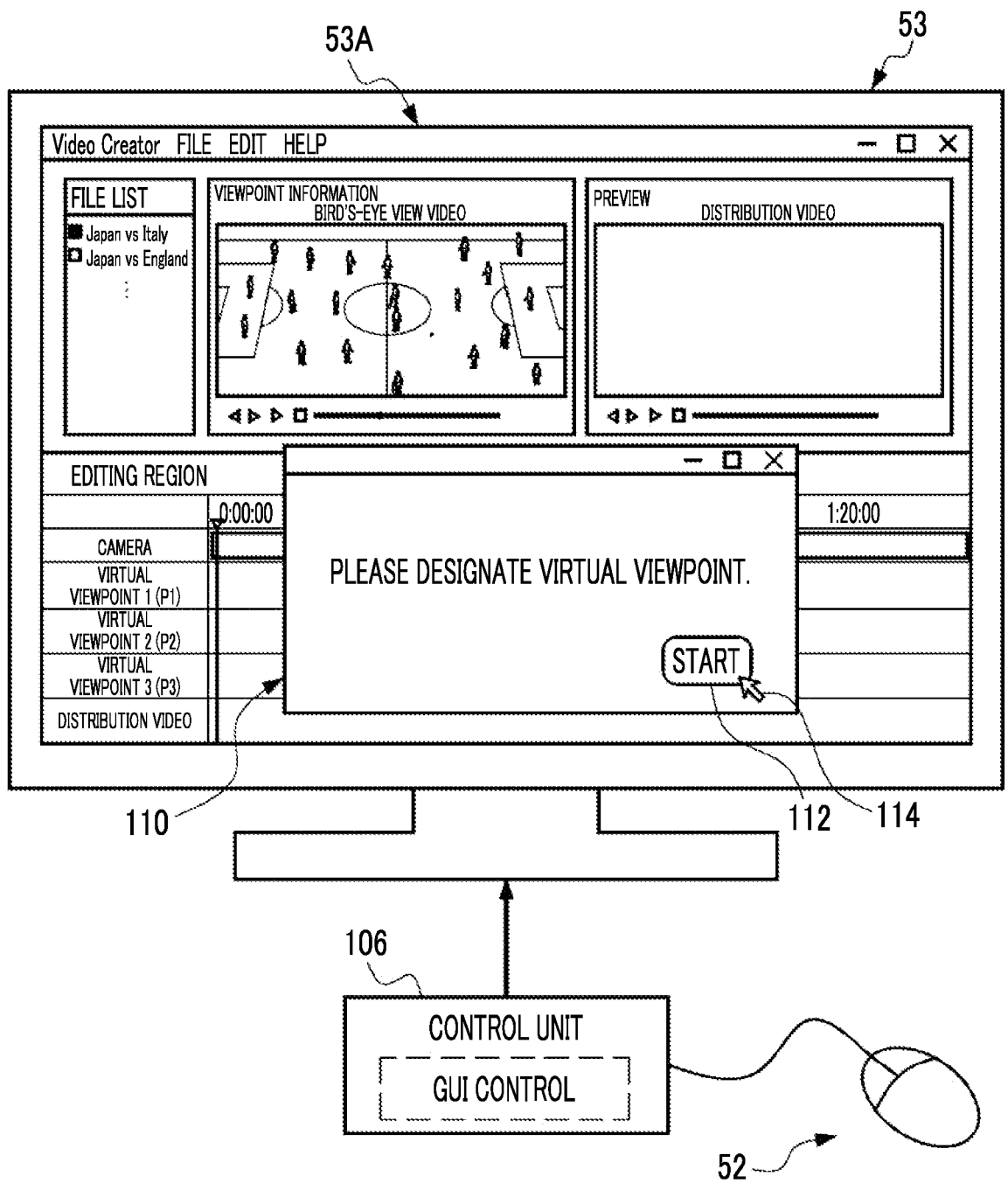
FIG. 6 is a conceptual diagram showing an example of a screen displayed in starting motion picture editing.

As shown in FIG. 6 as an example, in the information processing apparatus 12, the control unit 106 causes the display 53 to display various kinds of information in accordance with the instruction given by the user, and receives the operation of the reception device 52 and performs GUI control for executing processing corresponding to the reception result. Specifically, the control unit 106 causes the display 53 to display the motion picture editing screen 53A in response to the operation of the reception device 52. Then, the control unit 106 controls the information processing apparatus 12 so that the information processing apparatus 12 executes various kinds of processing related to motion picture editing in a case where a mouse as an example of the reception device 52 is operated by the user.

The control unit 106 displays, for example, a dialog 110, which prompts the user to designate a virtual viewpoint for generating the virtual viewpoint video, on the motion picture editing screen 53A when starting motion picture editing. In the dialog 110, a start button 112 for starting the designation of the virtual viewpoint is displayed. The user can start the designation of the virtual viewpoint by performing a click operation in a state in which a cursor 114 displayed on the motion picture editing screen 53A is positioned on the start button 112 by the operation of the above mouse.

Figure 7:
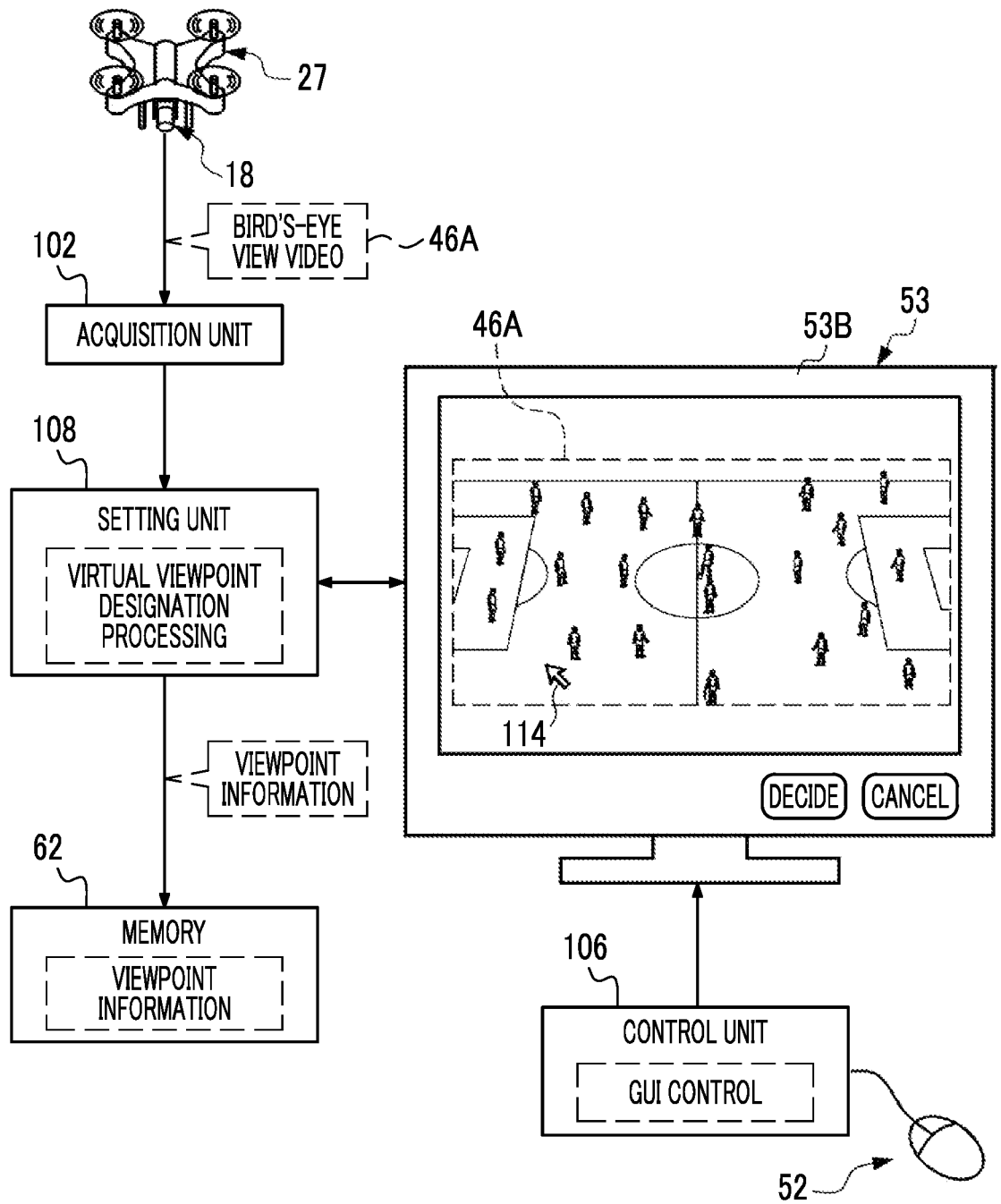
FIG. 7 is a conceptual diagram used to illustrate an example of a processing content of virtual viewpoint designation processing.

As shown in FIG. 7 as an example, the acquisition unit 102 acquires the bird's-eye view video 46A from the imaging device 18. The setting unit 108 performs virtual viewpoint designation processing for enabling the user to designate the virtual viewpoint. Specifically, the setting unit 108 causes the display 53 to display a virtual viewpoint designating screen 53B in cooperation with the control unit 106 that performs GUI control. The setting unit 108 displays the bird's-eye view video 46A acquired by the acquisition unit 102 on the virtual viewpoint designating screen 53B.

The user can designate the virtual viewpoint (designate the position, the line-of-sight direction, and the angle of view) by operating the mouse as an example of the reception device 52 while referring to the bird's-eye view video 46A, for example. The setting unit 108 generates viewpoint information including the position, the line-of-sight direction, and the angle of view of the designated virtual viewpoint, and causes the memory 62 to store the generated viewpoint information. The setting unit 108 makes it possible to designate a plurality of virtual viewpoints in accordance with the instruction given by the user through the reception device 52.

Figure 8:
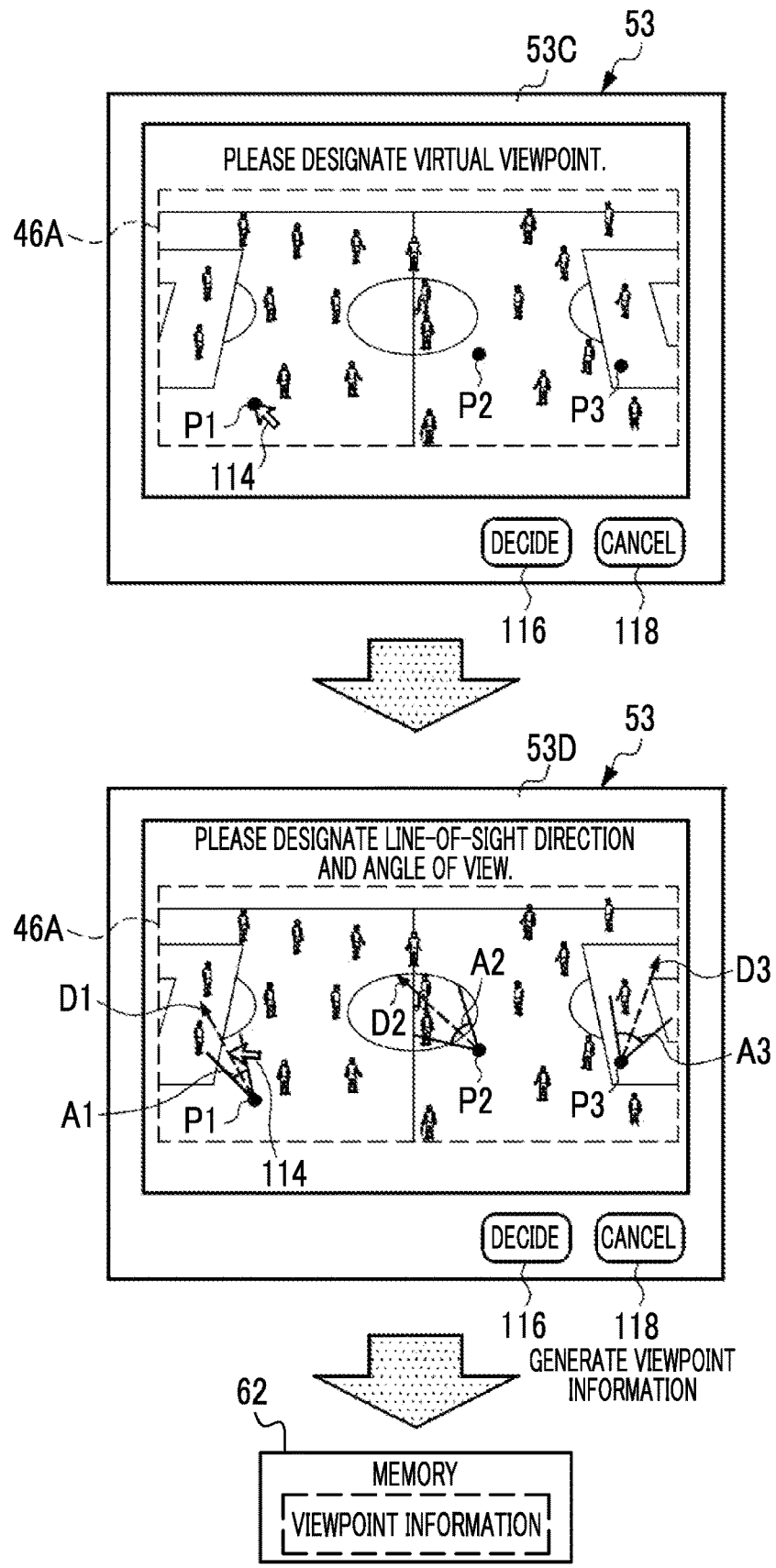
FIG. 8 is a conceptual diagram used to illustrate an example of screen transition in the virtual viewpoint designation processing.

As shown in FIG. 8 as an example, specifically, the setting unit 108 first causes the display 53 to display a first designation screen 53C that makes it possible to designate the position of the virtual viewpoint, to allow the user to designate the position of the virtual viewpoint. For example, a message "Please designate the position of the virtual viewpoint" is displayed on the first designation screen 53C. The user can designate the positions of a plurality of virtual viewpoints in the bird's-eye view video 46A by operating the mouse as an example of the reception device 52. A decision button 116 and a cancel button 118 are displayed on the first designation screen 53C. The user can decide or cancel the position of the virtual viewpoint by performing a click operation in a state in which the cursor 114 is moved onto the decision button 116 or the cancel button 118 by the operation of the above mouse.

In a case where the designation of the position of the virtual viewpoint ends, the setting unit 108 causes the display 53 to display a second designation screen 53D that makes it possible to designate the line-of-sight direction and the angle of view of the virtual viewpoint, to allow the user to designate the line-of-sight direction and the angle of view of the virtual viewpoint. For example, a message "Please designate the line-of-sight direction and the angle of view" is displayed on the second designation screen 53D. The user can designate the line-of-sight direction and the angle of view in the bird's-eye view video 46A by operating the above mouse. The decision button 116 and the cancel button 118 are displayed on the second designation screen 53D. The user can decide or cancel the line-of-sight direction and the angle of view of the virtual viewpoint by performing a click operation in a state in which the cursor 114 is moved onto the decision button 116 or the cancel button 118 by the operation of the above mouse.

The setting unit 108 generates the viewpoint information including the position, the line-of-sight direction, and the angle of view of the virtual viewpoint for each of the plurality of virtual viewpoints designated in the first designation screen 53C and the second designation screen 53D, and causes the memory 62 to store the generated viewpoint information. In the example shown in FIG. 8, three virtual viewpoints are designated. P1 to P3 each indicate the position of the virtual viewpoint. D1 to D3 each indicate the line-of-sight direction of the virtual viewpoint. A1 to A3 each indicate the angle of view of the virtual viewpoint.

Figure 9:
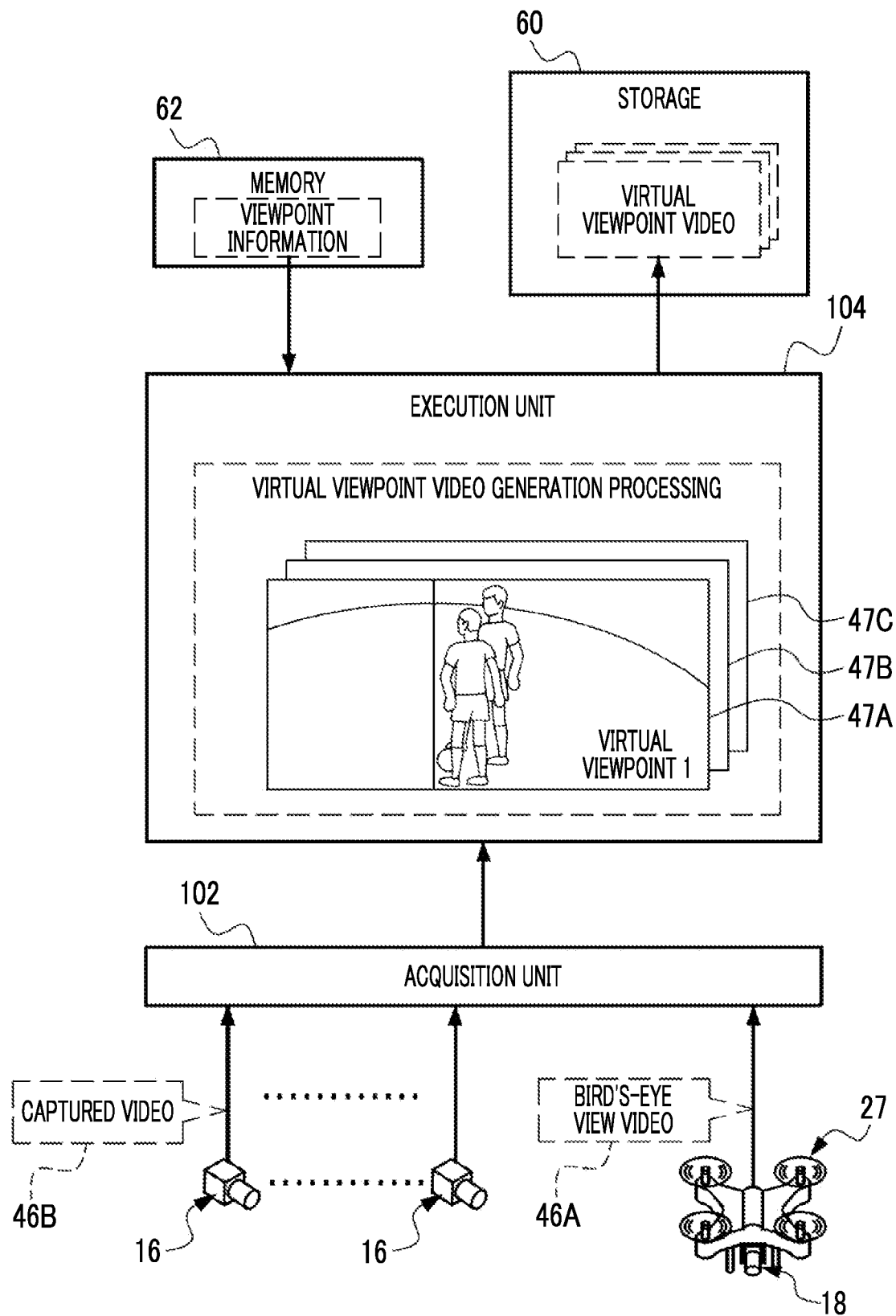
FIG. 9 is a conceptual diagram used to illustrate an example of a processing content of virtual viewpoint video generation processing.

As shown in FIG. 9 as an example, in the information processing apparatus 12, the execution unit 104 performs virtual viewpoint video generation processing for generating the virtual viewpoint video using the viewpoint information as a reference. The execution unit 104 acquires a plurality of motion picture data (as an example, the bird's-eye view video 46A and the plurality of captured videos 46B) through the acquisition unit 102. Further, the execution unit 104 acquires the viewpoint information generated by the virtual viewpoint designation processing by reading out the viewpoint information from the memory 62. Then, the execution unit 104 generates the virtual viewpoint video on the basis of the plurality of motion picture data, by using the acquired viewpoint information as a reference. Specifically, the execution unit 104 generates 3D polygons on the basis of the plurality of motion picture data to generate the virtual viewpoint video showing a visual field range decided by the viewpoint information. The virtual viewpoint video is a virtual video obtained in a case where the imaging region is observed in the line-of-sight direction from the position of the virtual viewpoint.

The execution unit 104 generates the virtual viewpoint video for each virtual viewpoint in a case where the viewpoint information includes information regarding the plurality of virtual viewpoints. Virtual viewpoint videos 47A to 47C shown in FIG. 9 are videos corresponding to the three virtual viewpoints shown in FIG. 8. The execution unit 104 causes the storage 60 to store the generated virtual viewpoint videos.

Figure 10:
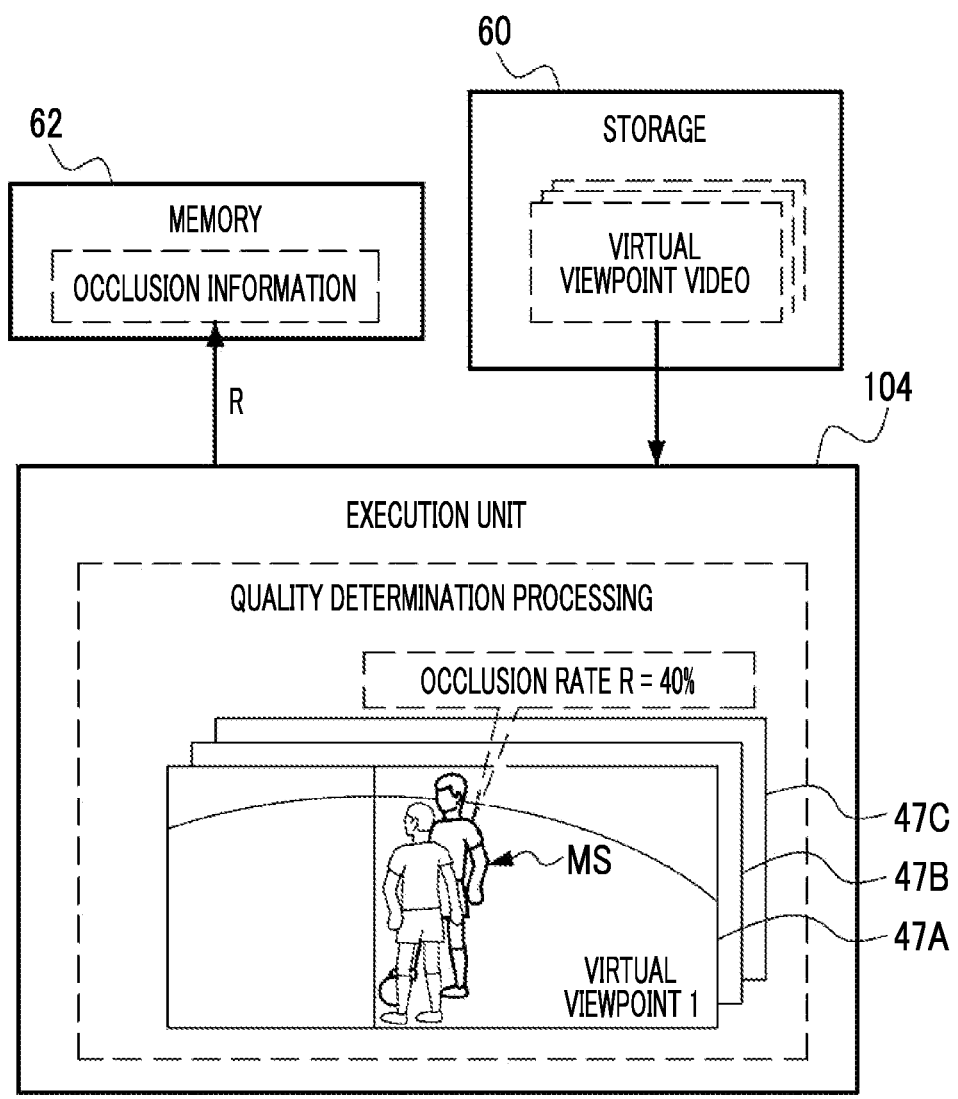
FIG. 10 is a conceptual diagram used to illustrate an example of a processing content of quality determination processing.

As shown in FIG. 10 as an example, in the information processing apparatus 12, the execution unit 104 performs quality determination processing for determining the quality of the virtual viewpoint video that is creatable with the viewpoint information as a reference. The execution unit 104 reads out the virtual viewpoint video generated by the virtual viewpoint video generation processing with the viewpoint information as a reference, from the storage 60. Then, the execution unit 104 determines the quality of the virtual viewpoint video read out from the storage 60. In the present embodiment, as an example, the quality is set as a value related to the proportion of an occlusion region of a specific subject included in the visual field range decided by the viewpoint information. Occlusion means that a subject positioned on the front side with respect to the virtual viewpoint occludes a subject positioned on the rear side, so that the subject positioned on the rear side cannot be observed at least partially. The smaller the proportion of the occlusion region (hereinafter, also referred to as an occlusion rate) is, the higher the quality of the virtual viewpoint video is.

In the present embodiment, the execution unit 104 specifies, for example, a subject positioned in the center of the visual field range as a target subject MS, and calculates an occlusion rate R of the specified target subject MS. The target subject MS, which is an example of the "specific subject" according to the technique of the present disclosure, may be specified by the operation of the user using the reception device 52, or may be specified by, for example, a pattern matching function, such as face recognition.

The execution unit 104 calculates the occlusion rate R by using each virtual viewpoint video generated by the virtual viewpoint video generation processing in a case where the plurality of virtual viewpoints are designated. The execution unit 104 causes the memory 62 to store the occlusion rate R calculated for each designated virtual viewpoint as occlusion information.

Figure 11:
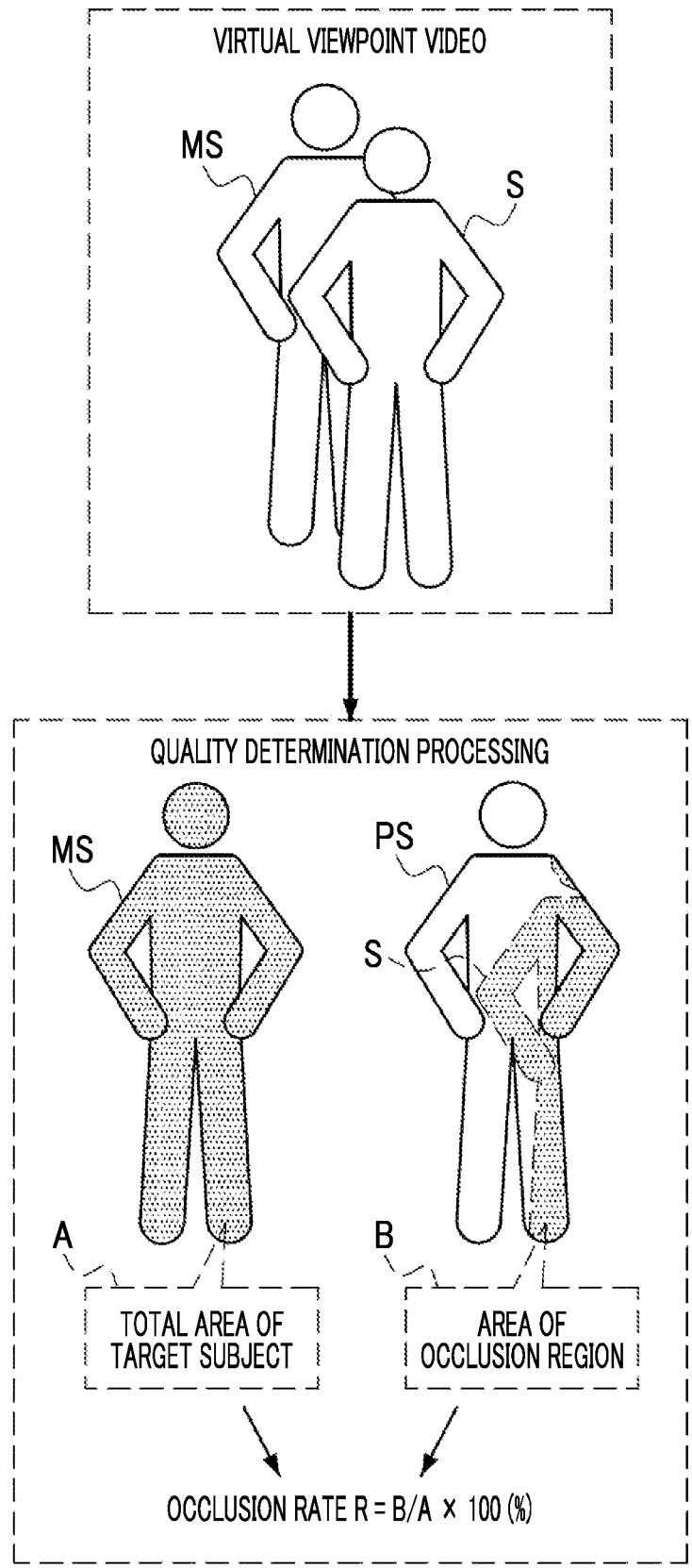
FIG. 11 is a conceptual diagram used to illustrate an example of a method for calculating an occlusion rate.

Specifically, the execution unit 104 calculates the occlusion rate R in procedures shown in FIG. 11 as an example. First, the execution unit 104 specifies the target subject MS and the other subject S existing in front of the target subject MS from the virtual viewpoint video. Next, the execution unit 104 obtains the total area A of the target subject MS and the area B of the occlusion region of the target subject MS generated by the other subject S. Then, the execution unit 104 calculates the occlusion rate R (%) on the basis of, for example, the calculation equation "R=B/A×100". The execution unit 104 calculates, for example, the occlusion rate R for each frame included in the virtual viewpoint video. That is, the occlusion information is information including the temporal change of the occlusion rate R for each designated virtual viewpoint.

Figure 12:
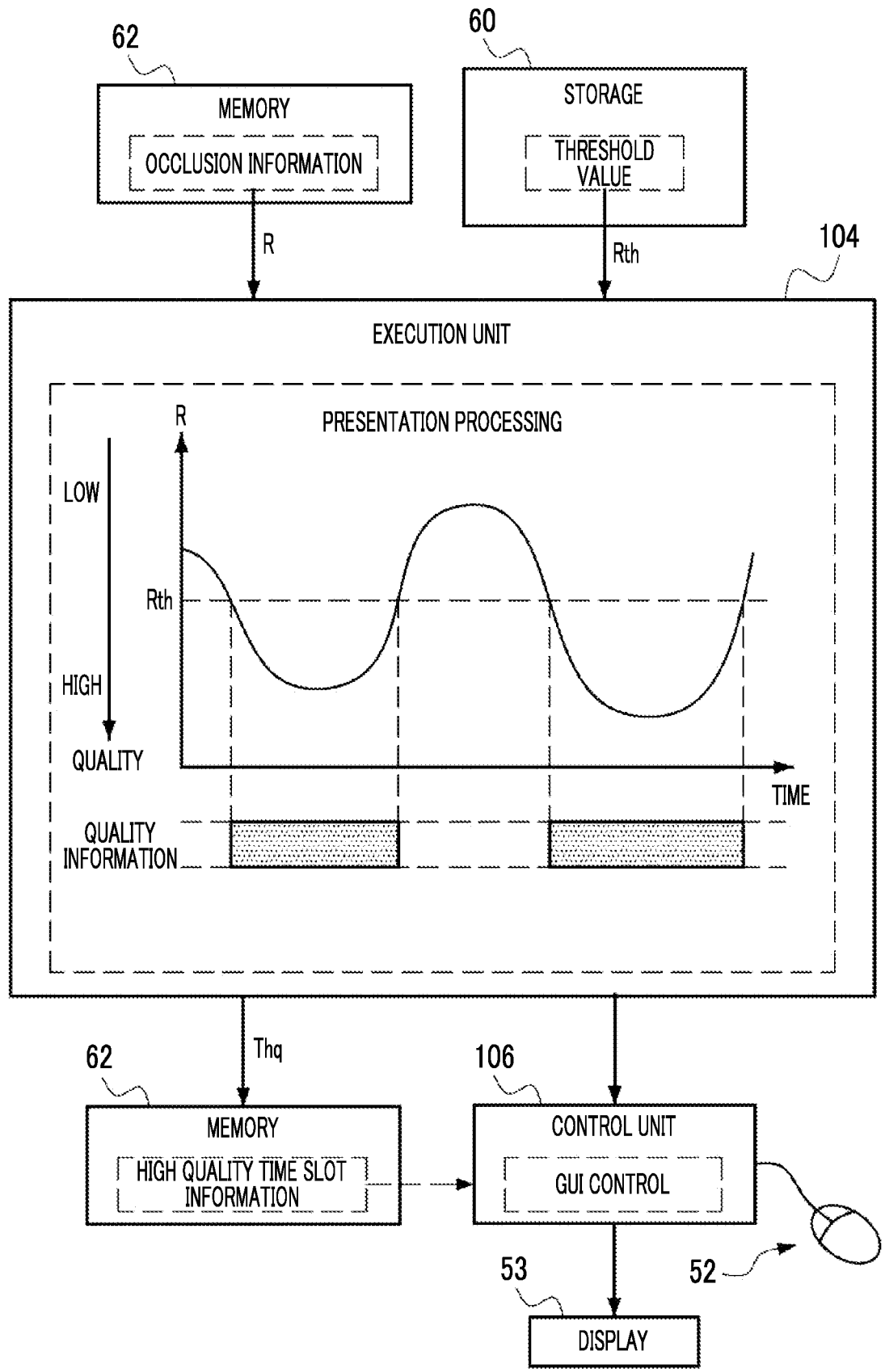
FIG. 12 is a conceptual diagram used to illustrate an example of a processing content of presentation processing.

As shown in FIG. 12 as an example, in the information processing apparatus 12, the execution unit 104 performs presentation processing for presenting the quality of the virtual viewpoint video. The execution unit 104 performs the presentation processing for presenting the quality information obtained by the quality determination processing to the user. The execution unit 104 reads out the occlusion information of each virtual viewpoint video calculated by the quality determination processing, from the memory 62. Further, the execution unit 104 reads out a threshold value Rth for quality set in advance, from the storage 60.

The execution unit 104 compares the occlusion rate R with the threshold value Rth, and specifies a time slot in which the occlusion rate R is less than the threshold value Rth as a high quality time slot Thq in which the quality of the virtual viewpoint video is high quality. The threshold value Rth is, for example, 20%. The execution unit 104 specifies a time slot in which the occlusion rate R is less than 20%. The threshold value Rth may be a fixed value set in advance, but the setting thereof may be changeable by the operation using the reception device 52 of the user.

The execution unit 104 causes the memory 62 to store the high quality time slot Thq of each specified virtual viewpoint video as high quality time slot information. Then, the execution unit 104 presents the high quality time slot information to the user. Specifically, the execution unit 104 displays the high quality time slot Thq on the motion picture editing screen 53A (see FIG. 6) with GUI control performed by the control unit 106. This high quality time slot Thq corresponds to the quality information indicating the quality of the virtual viewpoint video that is creatable with the viewpoint information as a reference.

The length of the high quality time slot Thq varies depending on the occlusion rate R. That is, the execution unit 104 changes a presentation mode of the high quality time slot Thq according to the occlusion rate R. In the present embodiment, the presentation mode of the high quality time slot Thq is a display mode that is changed by the control of the display 53 performed by the control unit 106.

Figure 13:
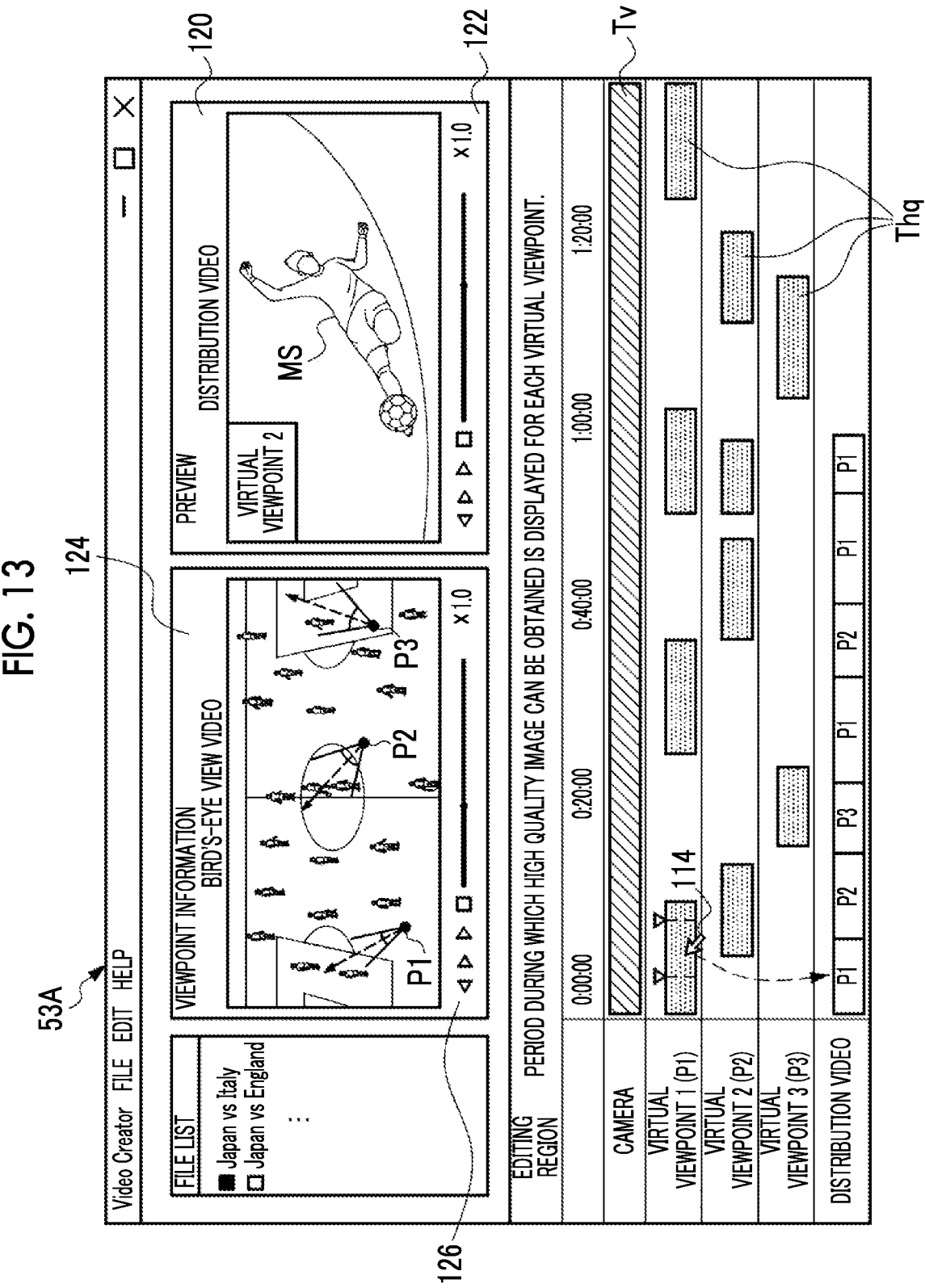
FIG. 13 is a conceptual diagram showing an example of a motion picture editing screen.

Specifically, the high quality time slot Thq is displayed on the motion picture editing screen 53A as shown in FIG. 13 as an example. The execution unit 104 presents the high quality time slot Thq in association with a period of imaging Tv performed by the plurality of imaging devices for each designated virtual viewpoint. In the example shown in FIG. 13, the high quality time slot Thq is displayed for each of the three virtual viewpoints. Generally, since the periods of imaging of the plurality of imaging devices are all the same, only one period of imaging Tv is displayed. In a case where the plurality of imaging devices have different periods of imaging, the periods of imaging may be displayed individually.

The user, for example, selects a plurality of periods from the high quality time slot Thq for each virtual viewpoint and connects the plurality of periods to each other by operating the mouse as an example of the reception device 52 on the motion picture editing screen 53A, whereby the user can create the distribution video.

The motion picture editing screen 53A is provided with a first display section 120 that is used to display a preview of the distribution video. In addition, the motion picture editing screen 53A is provided with a reproduction operation section 122 adjacent to the first display section 120. The user can perform the reproduction, the stop, the change of the reproduction speed, and the like of the distribution video by operating the reproduction operation section 122 using the above mouse or the like.

Similarly, the motion picture editing screen 53A is provided with a second display section 124 that is used to display the bird's-eye view video used to designate the virtual viewpoint. In addition, the motion picture editing screen 53A is provided with a reproduction operation section 126 adjacent to the second display section 124. The user can perform the reproduction, the stop, the change of the reproduction speed, and the like of the bird's-eye view video by operating the reproduction operation section 126 using the above mouse or the like.

Figure 14:
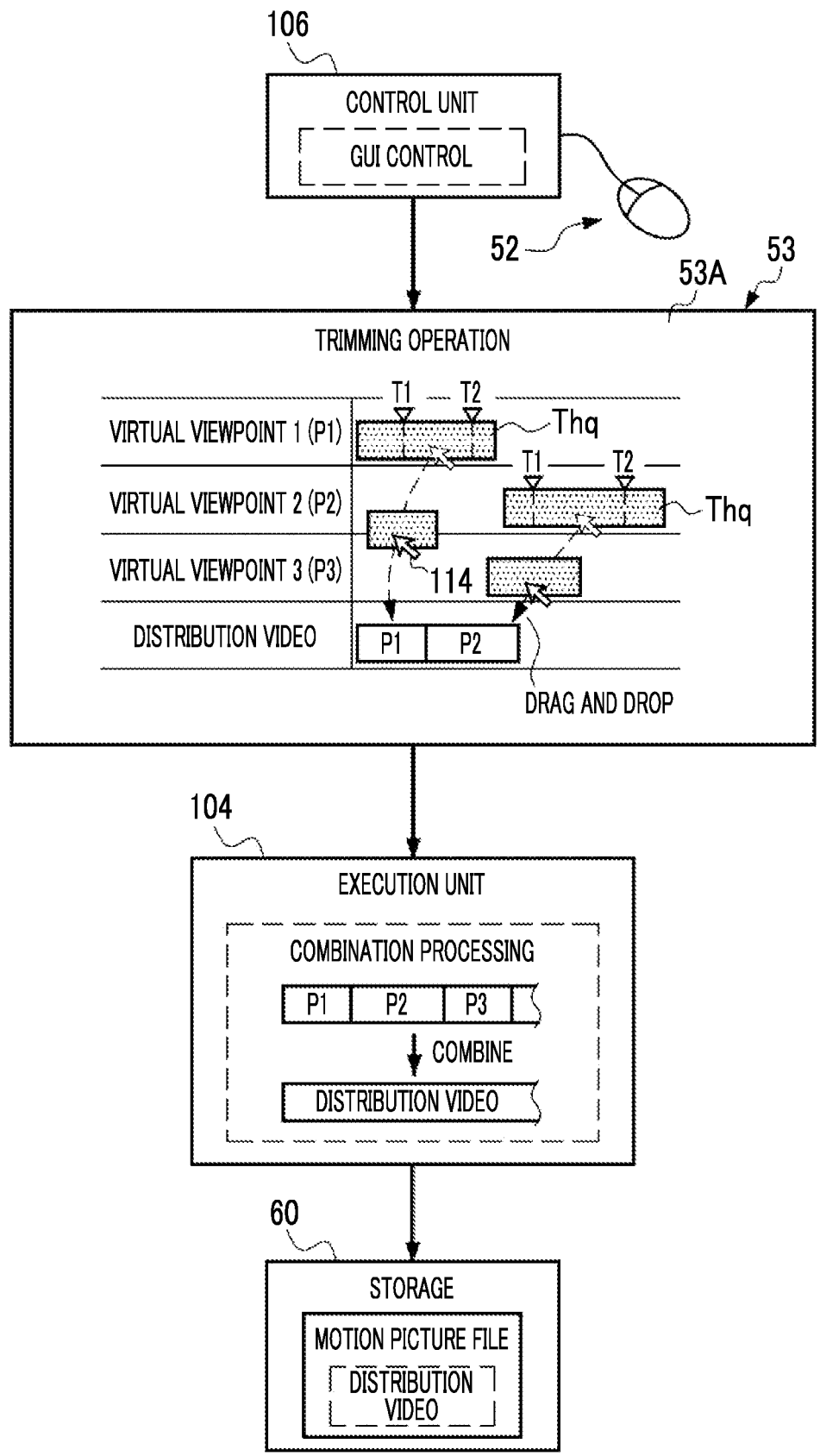
FIG. 14 is a conceptual diagram used to illustrate an example of a processing content of editing processing.

As shown in FIG. 14 as an example, the control unit 106 performs GUI control for editing the virtual viewpoint video and generating the distribution video. The user can set trimming markers T1 and T2 in the high quality time slot Thq displayed on the motion picture editing screen 53A. The trimming marker T1 indicates a trimming start position. The trimming marker T2 indicates a trimming end position. The user can extract a part intended by the user from the high quality time slot Thq by dragging and dropping parts defined by the trimming markers T1 and T2 with respect to the creation region of the distribution video. The user can select the time slot intended by the user from each virtual viewpoint video by performing the same trimming operation for a plurality of high quality time slots Thq.

The execution unit 104 performs combination processing for generating the distribution video by combining parts, which are selected by the trimming operation, of the plurality of virtual viewpoint videos. The execution unit 104 generates a motion picture file on the basis of the generated distribution video, and causes the storage 60 to store the generated motion picture file. The distribution video stored in the storage 60 is provided to the smart device 14, the receiver 34, and the like by the execution unit 104.

Next, the operation of the information processing system 10 will be described.

Figure 15:
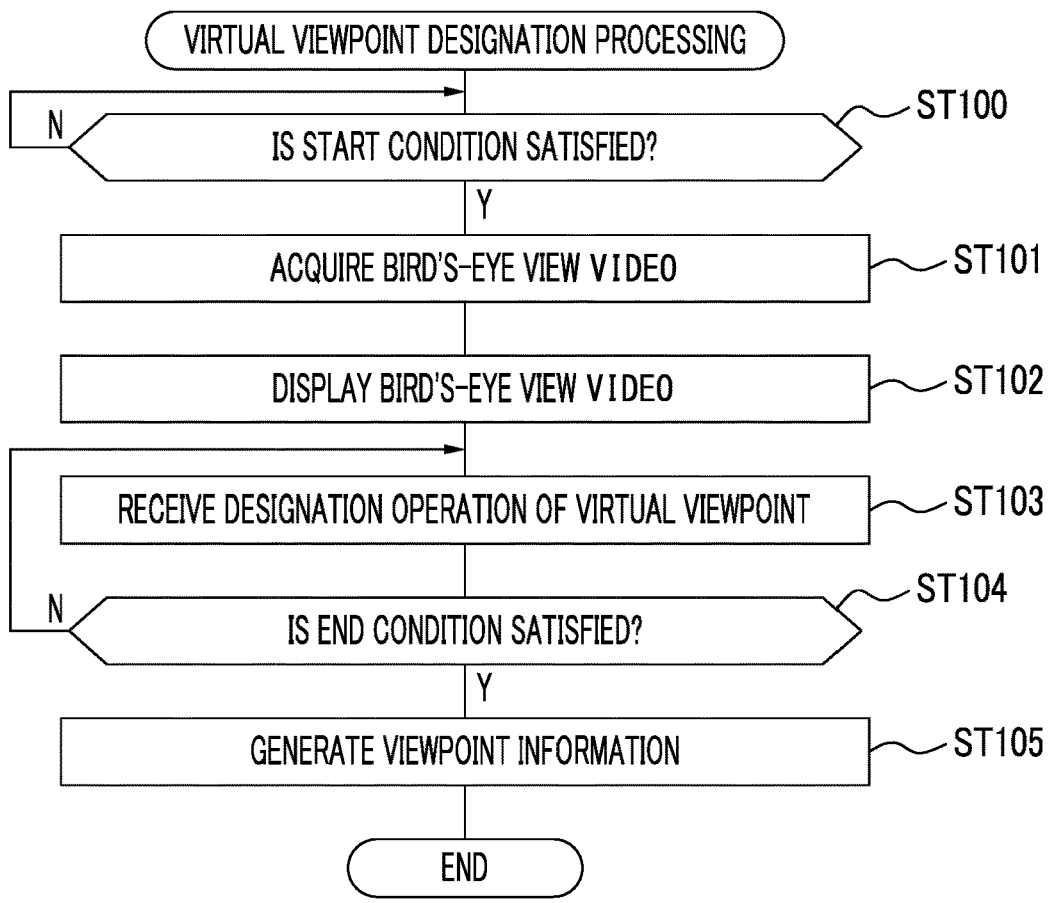
FIG. 15 is a flowchart showing an example of a flow of the virtual viewpoint designation processing.

First, an example of the flow of the virtual viewpoint designation processing executed by the CPU 58 of the information processing apparatus 12 will be described with reference to FIG. 15.

In the virtual viewpoint designation processing shown in FIG. 15, first, in step ST100, the setting unit 108 determines whether or not a condition of starting the virtual viewpoint designation processing (hereinafter, referred to as a "virtual viewpoint designation processing start condition") is satisfied. Examples of the virtual viewpoint designation processing start condition include a condition that an instruction to start the virtual viewpoint designation processing is received by the reception device 52 (see FIG. 6). In a case where the virtual viewpoint designation processing start condition is not satisfied in step ST100, a negative determination is made and the determination in step ST100 is performed again. In a case where the virtual viewpoint designation processing start condition is satisfied in step ST100, an affirmative determination is made and the virtual viewpoint designation processing proceeds to step ST101.

The acquisition unit 102 acquires the bird's-eye view video 46A from the imaging device 18 (see FIG. 7) in step ST101, and then the virtual viewpoint designation processing proceeds to step ST102. The setting unit 108 displays the bird's-eye view video 46A on the virtual viewpoint designating screen 53B in step ST102, and then the virtual viewpoint designation processing proceeds to step ST103.

In step ST103, the setting unit 108 receives a setting operation including the position, the line-of-sight direction, and the angle of view of the virtual viewpoint through the reception device 52 (see FIG. 8).

In next step ST104, the setting unit 108 determines whether or not a condition of ending the virtual viewpoint designation processing (hereinafter, referred to as a "virtual viewpoint designation processing end condition") is satisfied. Examples of the virtual viewpoint designation processing end condition include a condition that an instruction to end the virtual viewpoint designation processing is received by the reception device 52.

In a case where the virtual viewpoint designation processing end condition is not satisfied in step ST104, a negative determination is made and the virtual viewpoint designation processing proceeds to step ST103. In a case where the virtual viewpoint designation processing end condition is satisfied in step ST104, an affirmative determination is made and the virtual viewpoint designation processing proceeds to step ST105.

In step ST105, the setting unit 108 generates the viewpoint information and causes the memory 62 to store the viewpoint information. With this, the virtual viewpoint designation processing ends.

Next, an example of the flow of the virtual viewpoint video generation processing executed by the CPU 58 of the information processing apparatus 12 will be described with reference to FIG. 16.

Figure 16:
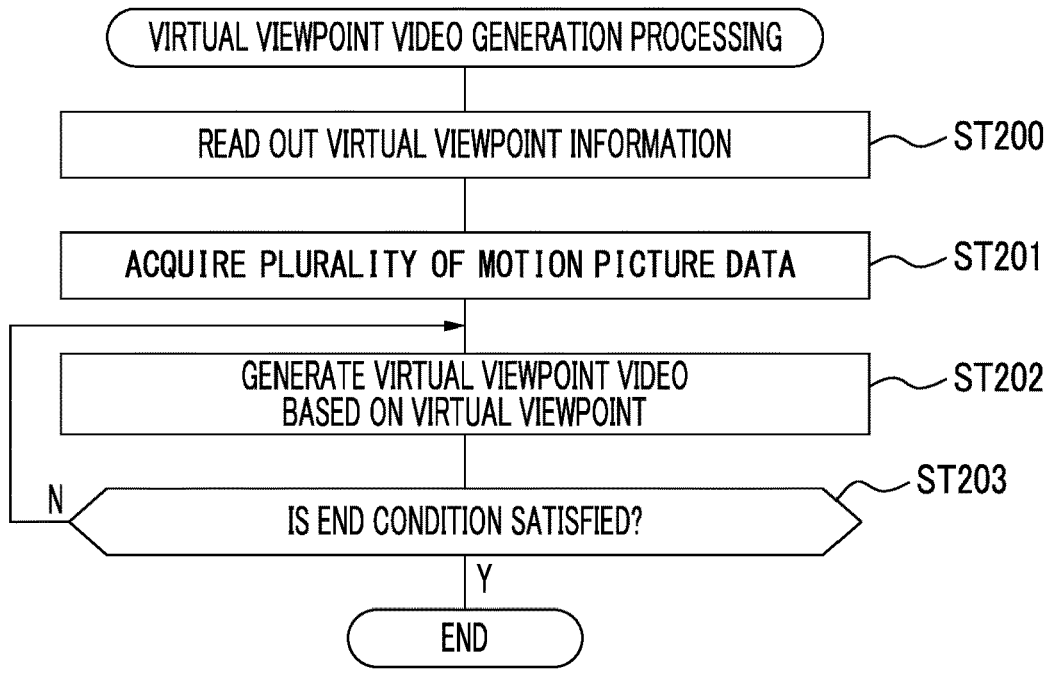
FIG. 16 is a flowchart showing an example of a flow of the virtual viewpoint video generation processing.

In the virtual viewpoint video generation processing shown in FIG. 16, first, in step ST200, the execution unit 104 reads out the viewpoint information stored in the memory 62.

In next step ST201, the acquisition unit 102 acquires the plurality of motion picture data (as an example, the bird's-eye view video 46A and the plurality of captured videos 46B) from the plurality of imaging devices, and then the virtual viewpoint video generation processing proceeds to step ST202.

In step ST202, the execution unit 104 generates the virtual viewpoint video showing the visual field range decided by the viewpoint information, and causes the storage 60 to store the generated virtual viewpoint video (see FIG. 9).

In next step ST203, the execution unit 104 determines whether or not a condition of ending the virtual viewpoint video generation processing (hereinafter, referred to as a "virtual viewpoint video generation processing end condition") is satisfied. Examples of the virtual viewpoint video generation processing end condition include a condition that the generation of the virtual viewpoint videos using all the virtual viewpoints, which are designated by the virtual viewpoint designation processing, as a reference has ended.

In a case where the virtual viewpoint video generation processing end condition is not satisfied in step ST203, a negative determination is made and the virtual viewpoint video generation processing proceeds to step ST202. In a case where the virtual viewpoint video generation processing end condition is satisfied in step ST203, an affirmative determination is made and the virtual viewpoint video generation processing ends.

Next, an example of the flow of the quality determination processing executed by the CPU 58 of the information processing apparatus 12 will be described with reference to FIG. 17.

Figure 17:
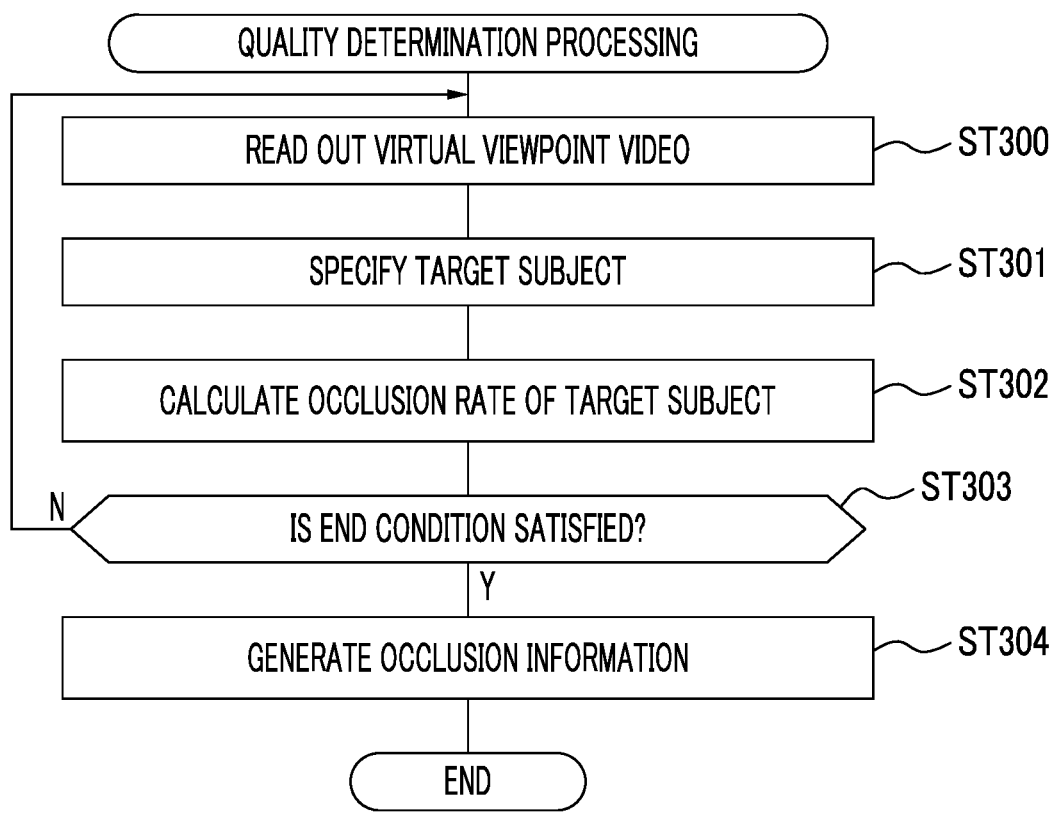
FIG. 17 is a flowchart showing an example of a flow of the quality determination processing.

In the quality determination processing shown in FIG. 17, first, in step ST300, the execution unit 104 reads out the virtual viewpoint video stored in the storage 60. In next step ST301, the execution unit 104 specifies the target subject included in the visual field range decided by the viewpoint information, and then the quality determination processing proceeds to step ST302.

In step ST302, the execution unit 104 calculates the occlusion rate of the target subject as the quality of the virtual viewpoint video (see FIGS. 10 and 11).

In next step ST303, the execution unit 104 determines whether or not a condition of ending the quality determination processing (hereinafter, referred to as a "quality determination processing end condition") is satisfied. Examples of the quality determination processing end condition include a condition that the calculation of the occlusion rates for all the virtual viewpoint videos generated by the virtual viewpoint video generation processing has ended.

In a case where the quality determination processing end condition is not satisfied in step ST303, a negative determination is made and the quality determination processing proceeds to step ST300. In a case where the quality determination processing end condition is satisfied in step ST303, an affirmative determination is made and the quality determination processing proceeds to step ST304.

In step ST304, the execution unit 104 generates the occlusion information and causes the memory 62 to store the occlusion information. With this, the quality determination processing ends.

Next, an example of the flow of the presentation processing executed by the CPU 58 of the information processing apparatus 12 will be described with reference to FIG. 18.

Figure 18:
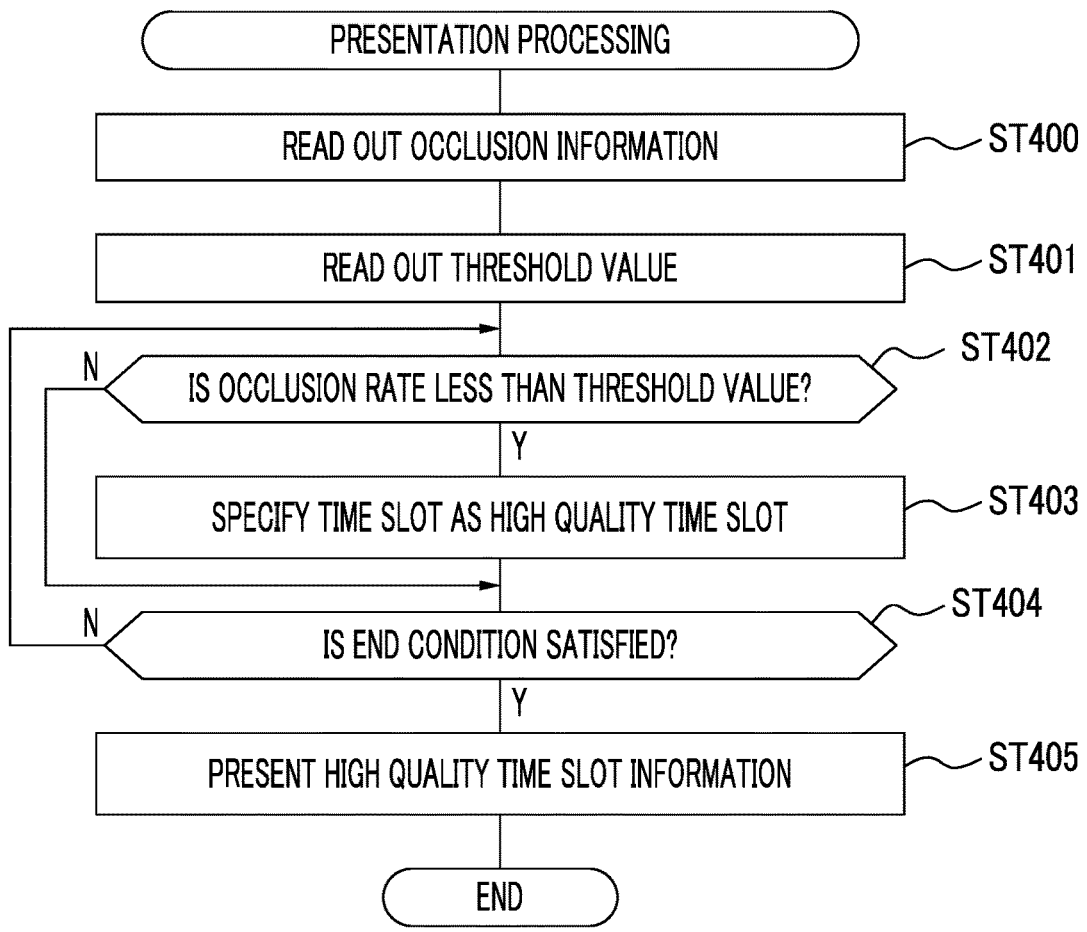
FIG. 18 is a flowchart showing an example of a flow of the presentation processing.

In the presentation processing shown in FIG. 18, first, in step ST400, the execution unit 104 reads out the occlusion information from the memory 62.

In next step ST401, the execution unit 104 reads out the threshold value stored in the storage 60, and then the presentation processing proceeds to step ST402.

In step ST402, the execution unit 104 compares the occlusion rate with the threshold value and determines whether or not the occlusion rate is less than the threshold value. In a case where the occlusion rate is less than the threshold value in step ST402, an affirmative determination is made and the presentation processing proceeds to step ST403. In a case where the occlusion rate is the threshold value or more in step ST402, a negative determination is made and the presentation processing proceeds to step ST404.

In step ST403, the execution unit 104 specifies a time slot in which the occlusion rate is less than the threshold value, as the high quality time slot (see FIG. 12). In next step ST404, the execution unit 104 determines whether or not a condition of ending the presentation processing (hereinafter, referred to as a "presentation processing end condition") is satisfied. Examples of the presentation processing end condition include a condition that the specification of the high quality time slot has ended for all the occlusion information.

In a case where the presentation processing end condition is not satisfied in step ST404, a negative determination is made and the presentation processing proceeds to step ST402. In a case where the presentation processing end condition is satisfied in step ST404, an affirmative determination is made and the presentation processing proceeds to step ST405.

In step ST405, the execution unit 104 causes the memory 62 to store the high quality time slot of each virtual viewpoint video specified in step ST403 as high quality time slot information, and displays the high quality time slot on the motion picture editing screen 53A (see FIG. 13) to present the high quality time slot to the user.

Next, an example of the flow of the editing processing executed by the CPU 58 of the information processing apparatus 12 will be described with reference to FIG. 19.

Figure 19:
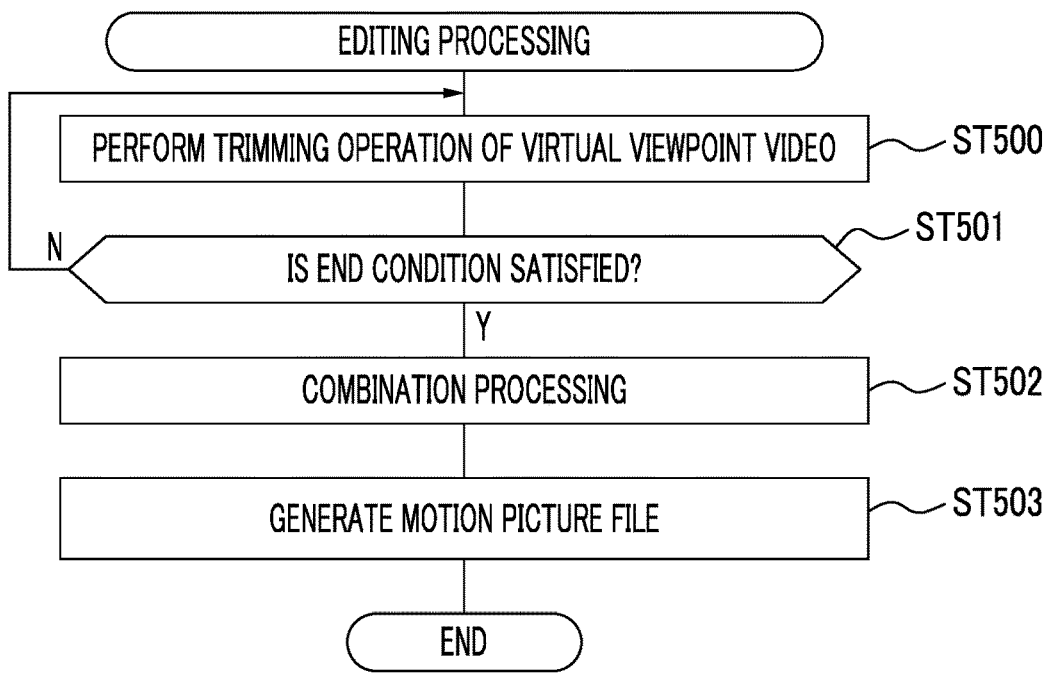
FIG. 19 is a flowchart showing an example of a flow of the editing processing.

In the editing processing shown in FIG. 19, first, in step ST500, the execution unit 104 receives the trimming operation of the virtual viewpoint video through the reception device 52. A time slot intended by the user is selected from each virtual viewpoint video by this trimming operation in order to generate the distribution video (see FIG. 14).

In next step ST501, the execution unit 104 determines whether or not a condition of ending the editing processing (hereinafter, referred to as an "editing processing end condition") is satisfied. Examples of the editing processing end condition include a condition that an instruction to end the editing processing is received by the reception device 52.

In a case where the editing processing end condition is not satisfied in step ST501, a negative determination is made and the editing processing proceeds to step ST500. In a case where the editing processing end condition is satisfied in step ST501, an affirmative determination is made and the editing processing proceeds to step ST502.

In step ST502, the execution unit 104 performs combination processing for combining parts, which are selected by the trimming operation in step ST500, of the plurality of virtual viewpoint videos.

In next step ST503, the execution unit 104 generates the motion picture file on the basis of the distribution video generated by executing the combination processing in step ST502, and causes the storage 60 to store the generated motion picture file. With this, the editing processing ends.

As described above, in the information processing apparatus 12, the CPU 58 acquires the viewpoint information regarding at least one virtual viewpoint, and presents the quality information indicating the quality of the virtual viewpoint video that is creatable with the viewpoint information as a reference, on the basis of the plurality of motion picture data obtained by being captured by the plurality of imaging devices. Therefore, it is possible to support the editing of the virtual viewpoint video.

In addition, in the information processing apparatus 12, the CPU 58 presents the quality information in association with the period of imaging performed by the plurality of imaging devices. This makes it possible for the user to efficiently perform editing work while referring to the period of imaging.

Further, in the information processing apparatus 12, the viewpoint information includes the position, the line-of-sight direction, and the angle of view of the virtual viewpoint, and the quality is a value related to the proportion of the occlusion region of the specific subject included in the visual field range decided by the viewpoint information. The smaller the proportion of the occlusion region is, the higher the quality is. This makes it possible for the user to easily select a time slot in which the proportion of the occlusion region is small for the specific subject.

Further, in the information processing apparatus 12, the presentation mode is changed by the CPU 58 according to the proportion of the occlusion region. This makes it possible for the user to intuitively recognize the proportion of the occlusion region. In the above embodiment, the presentation mode is changed by the control of the display performed by the CPU 58. Specifically, the corresponding time slot is displayed according to whether or not the proportion of the occlusion region is less than the threshold value.

Further, in the information processing apparatus 12, the viewpoint information regarding at least one virtual viewpoint designated by the reception device 52 is acquired by being generated by the setting unit 108. Then, the virtual viewpoint video using the viewpoint information as a reference is generated by the execution unit 104. With this, it is possible to obtain the virtual viewpoint video using the virtual viewpoint intended by the user as a reference.

Figure 20:
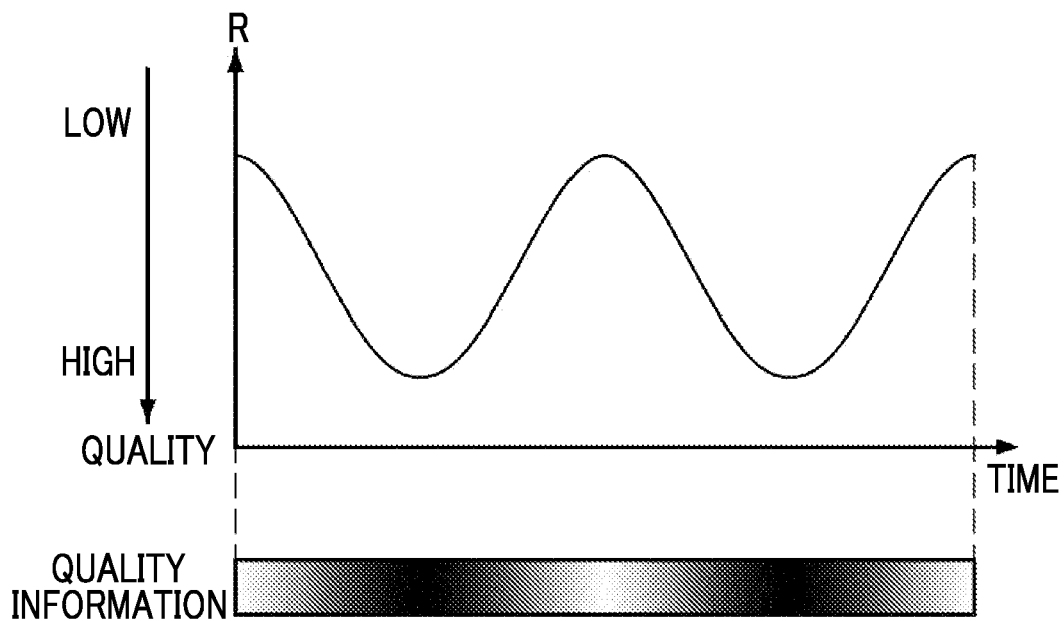
FIG. 20 is a conceptual diagram used to illustrate a first modification example of a presentation mode of quality information.

In the above embodiment, the CPU 58 uses the threshold value to change the display mode, but a display mode in which color, color depth, or the like is changed according to the proportion of the occlusion region may be used without using the threshold value. As shown in FIG. 20 as an example, the quality information may be presented in a display mode in which the lower the proportion of the occlusion region (occlusion rate R) is, that is, the higher the quality is, the higher the color depth is. Alternatively, the presentation mode of the quality information is not limited to the display on a display or the like, and may be, for example, an audio output using a speaker or the like and/or a print display printed on a paper medium or the like. That is, the "presentation" according to the present disclosure includes, for example, visible display, audio, and/or print display.

Further, in the above embodiment, the quality of the virtual viewpoint video is represented by the proportion of the occlusion region of the specific subject, but the quality of the virtual viewpoint video may be represented by using other parameters instead of the proportion of the occlusion region. For example, the quality may be a value related to the number of pixels of or the degree of focusing on the specific subject included in the visual field range decided by the viewpoint information. In this case, the greater the number of pixels is or the higher the degree of focusing is, the higher the quality is.

Figure 21:
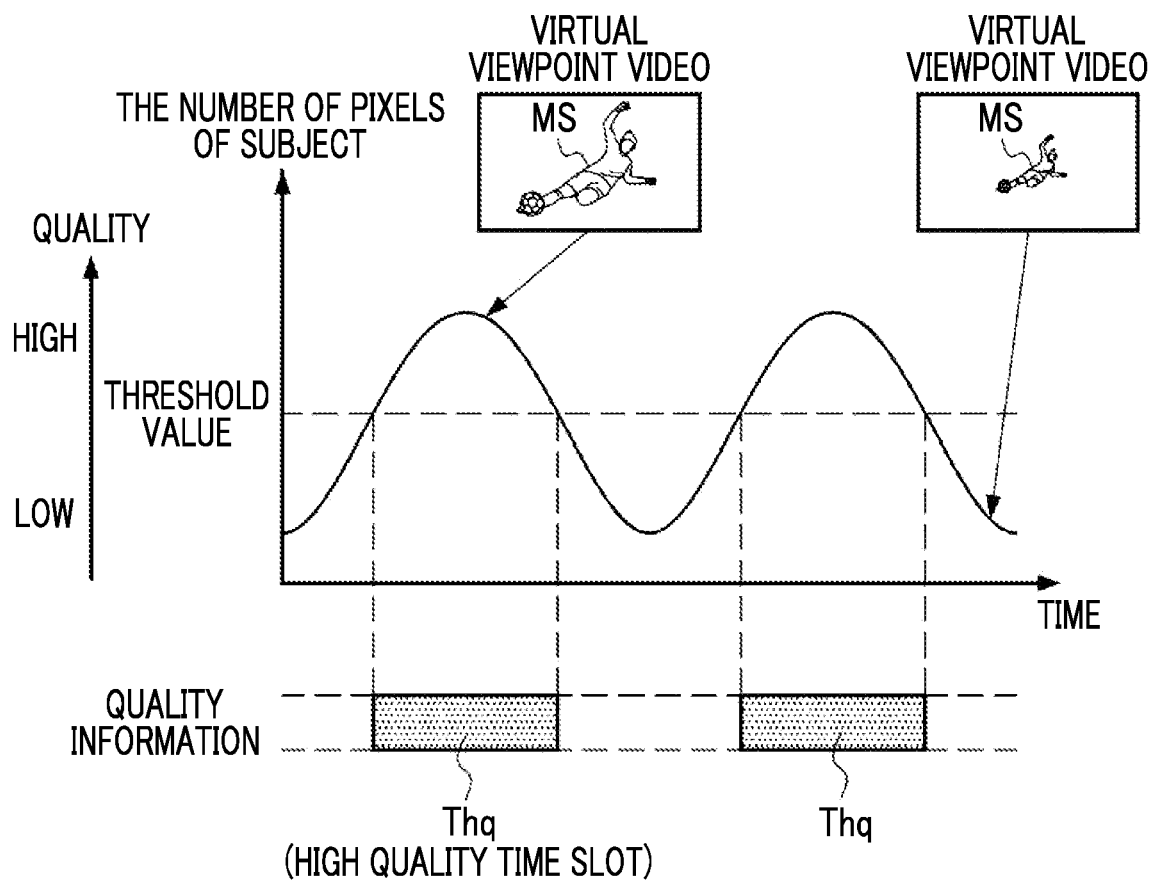
FIG. 21 is a conceptual diagram used to illustrate a first modification example of the quality determination processing.

As shown in FIG. 21 as an example, the number of pixels (that is, the size) of the target subject MS in the virtual viewpoint video is associated with the quality of the virtual viewpoint video. In this case, the greater the number of pixels of the target subject MS is (the larger the target subject MS is), the higher the quality is. The CPU 58 need only specify a time slot in which the number of pixels of the target subject MS is a threshold value or more, as the high quality time slot Thq.

The same applies to a case where the quality of the virtual viewpoint video is associated with the degree of focusing on the specific subject. For example, the CPU 58 need only specify a time slot in which the degree of focusing on the target subject MS is a threshold value or more, as the high quality time slot Thq. Here, the degree of focusing refers to, for example, the degree of focusing on the specific subject or the degree of focusing on a real spatial domain shown by the virtual viewpoint video. The degree of focusing is specified by, for example, the contrast and/or the depth of field of the virtual viewpoint video.

Further, the quality of the virtual viewpoint video is not limited to one parameter, and may be represented by a plurality of parameters (for example, a combination of at least two of the occlusion rate, the number of pixels, or the degree of focusing).

Further, in the above embodiment, the CPU 58 presents only the time slot in which the quality is the threshold value or more, among the time slot in which the quality is the threshold value or more and the time slot in which the quality is less than the threshold value. In the above embodiment, a case where the proportion of the occlusion region is less than the threshold value corresponds to a case where the quality is the threshold value or more. Further, in the example shown in FIG. 21, a case where the number of pixels of the target subject MS is the threshold value or more corresponds to a case where the quality is the threshold value or more.

Figure 22:
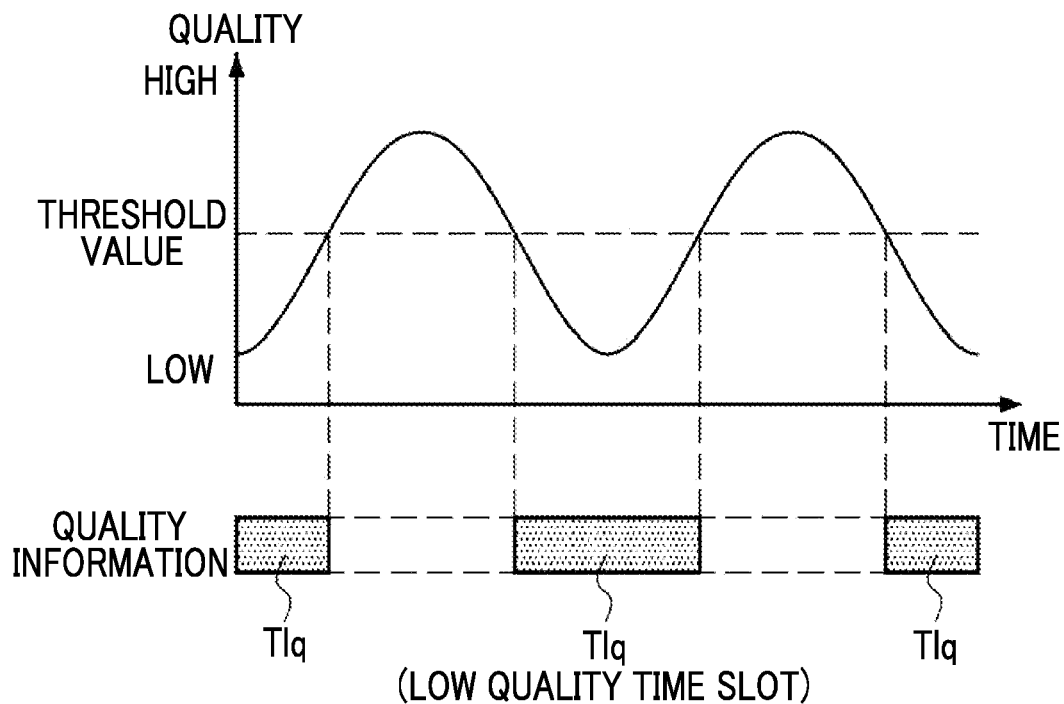
FIG. 22 is a conceptual diagram used to illustrate a second modification example of the presentation mode of the quality information.

The technique of the present disclosure is not limited to the above example, and the CPU 58 may present a time slot in which the quality is less than the threshold value, among the time slot in which the quality is the threshold value or more and the time slot in which the quality is less than the threshold value. As shown in FIG. 22 as an example, a time slot in which the quality is less than the threshold value may be specified as a low quality time slot Tlq, and the specified low quality time slot Tlq may be displayed on the display or the like. That is, at least one of the time slot in which the quality is the threshold value or more or the time slot in which the quality is less than the threshold value need only be presented. In this case, the user can intuitively recognize the time slot in which the quality is the threshold value or more and the other time slot.

Figure 23:
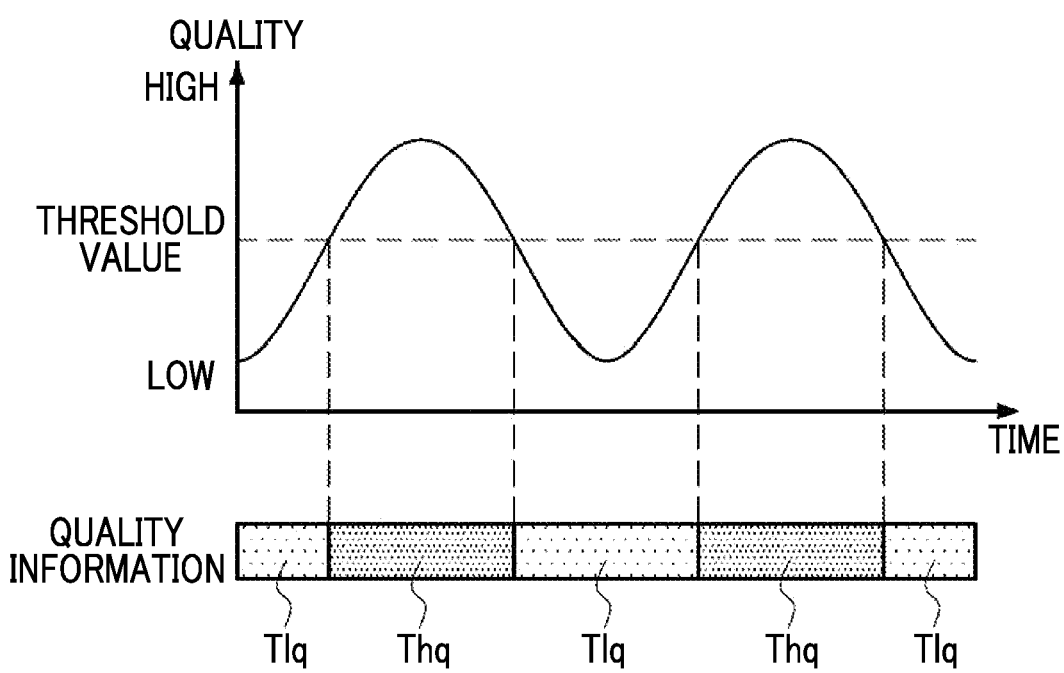
FIG. 23 is a conceptual diagram used to illustrate a third modification example of the presentation mode of the quality information.

Further, the CPU 58 may distinguish and present both the time slot in which the quality is the threshold value or more and the time slot in which the quality is less than the threshold value. As shown in FIG. 23 as an example, the high quality time slot Thq in which the quality is the threshold value or more and the low quality time slot Tlq in which the quality is less than the threshold value may be displayed on the display or the like in different display modes so that the high quality time slot Thq and the low quality time slot Tlq can be distinguished from each other. In this case as well, the user can intuitively recognize the time slot in which the quality is the threshold value or more and the other time slot.

Figure 24:
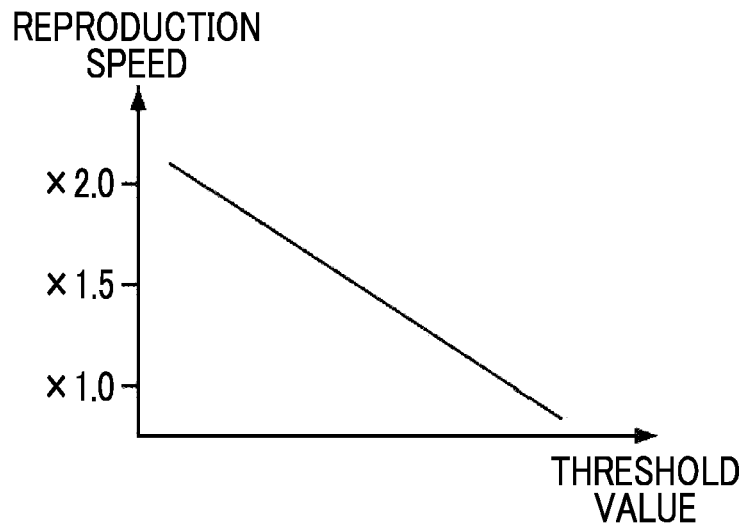
FIG. 24 is a conceptual diagram used to illustrate a first modification example of the quality determination processing.

Further, in the above embodiment, the CPU 58 sets the threshold value for performing the quality determination processing as a fixed value, but the threshold value may be changed according to various parameters. As shown in FIG. 24 as an example, the threshold value for quality may be changed according to the reproduction speed of the motion picture file. Specifically, the CPU 58 lowers the threshold value as the reproduction speed increases. In the above embodiment, the reproduction speed of the motion picture file can be changed by the operation through the reproduction operation section 122.

The higher the reproduction speed of the motion picture file is, the lower the visibility of each frame of the distribution video is. Therefore, the tolerance for quality increases for the viewer of the distribution video as the reproduction speed increases. Accordingly, the CPU 58 lowers the threshold value as the reproduction speed increases, whereby the time slot that can be selected from the virtual viewpoint video is expanded. With this, the degree of freedom of editing is improved.

Further, in the above embodiment, the CPU 58 uses only one threshold value in the quality determination processing, but the technique of the present disclosure is not limited thereto, and a plurality of threshold values may be used in the quality determination processing. In a case where the plurality of threshold values are used, the CPU 58 presents at least one of the time slot in which the quality is the threshold value or more or the time slot in which the quality is less than the threshold value, for each threshold value. With this, the user can select the time slot on the basis of a plurality of qualities from the virtual viewpoint video, so that the degree of freedom of editing is improved.

Figure 25:
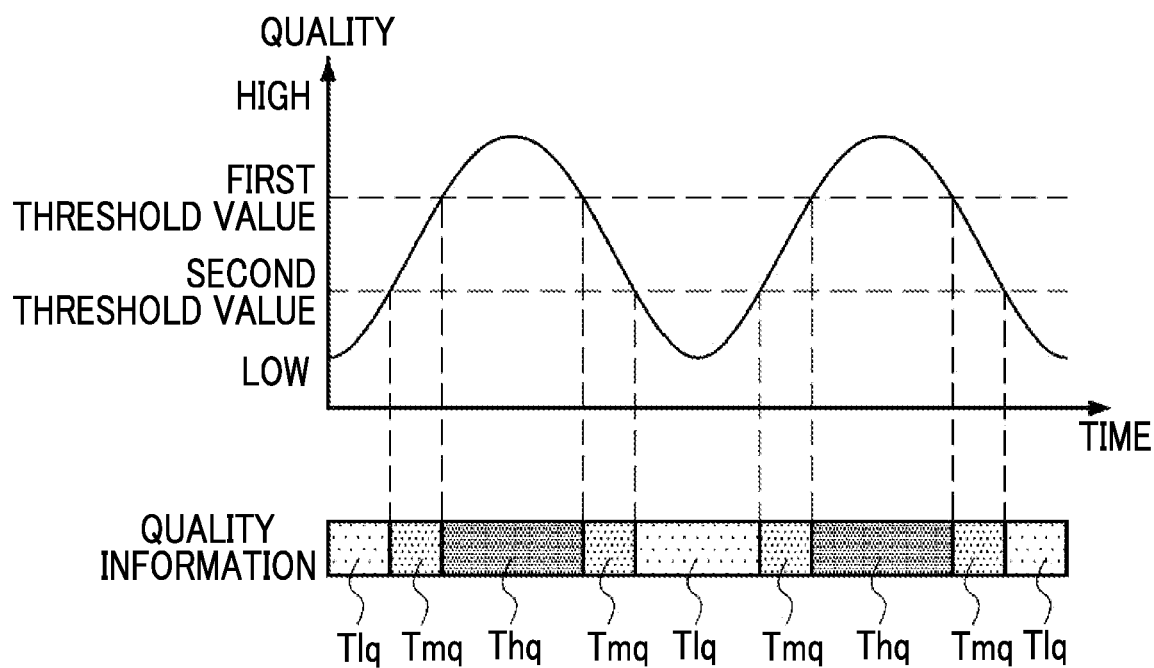
FIG. 25 is a conceptual diagram used to illustrate a second modification example of the quality determination processing.

As shown in FIG. 25 as an example, the CPU 58 performs quality determination processing using the first threshold value and the second threshold value. Here, it is assumed that the first threshold value is larger than the second threshold value. The CPU 58 causes the display or the like to display, for example, a time slot in which the quality is the first threshold value or more as a high quality time slot Thq, a time slot in which the quality is the second threshold value or more and less than the first threshold value as a medium quality time slot Tmq, and a time slot in which the quality is less than the second threshold value as a low quality time slot Tlq. In the example shown in FIG. 25, each time slot is distinguished by color depth, but the time slot may be distinguished by, for example, characters, symbols, and/or numbers.

Further, in the above embodiment, the viewpoint information includes the plurality of virtual viewpoints, and the CPU 58 presents the quality information for each virtual viewpoint. This makes it possible for the user to perform editing on the basis of the virtual viewpoint videos using the plurality of virtual viewpoints as a reference, so that the degree of freedom of editing is improved.

Figure 26:
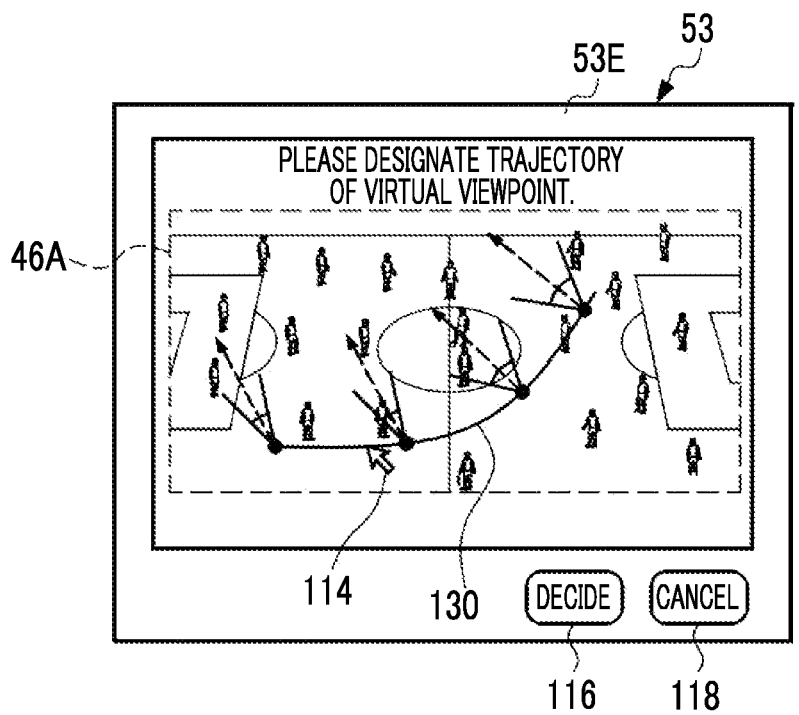
FIG. 26 is a conceptual diagram used to illustrate a modification example related to designation of a virtual viewpoint.

Further, in the above embodiment, the position of the virtual viewpoint is fixed, but the trajectory of the virtual viewpoints may be designatable. The trajectory indicates the temporal movement of one virtual viewpoint. That is, the trajectory is constituted of the plurality of virtual viewpoints of which the temporal positions are different from each other. As shown in FIG. 26 as an example, the CPU 58 causes the display 53 to display a trajectory designation screen 53E that makes it possible to designate the trajectory of the virtual viewpoints, to allow the user to designate a trajectory 130 of desired virtual viewpoints. The user can designate the trajectory 130 of the plurality of virtual viewpoints in the bird's-eye view video 46A by operating the mouse. The trajectory 130 of the virtual viewpoints is obtained by designating the position, the line-of-sight direction, and the angle of view of the plurality of virtual viewpoints. Further, the moving speed of the virtual viewpoint may be changeable depending on the density of the designated virtual viewpoints. The CPU 58 presents the quality information indicating the quality of the virtual viewpoint video that is creatable from the position of each virtual viewpoint constituting the trajectory 130. The presentation mode of the quality information is the same as that of the above embodiment. With this, it is possible to support the creation of a dynamic video in which the viewpoint moves.

In the above embodiment, a configuration is adopted in which the virtual viewpoint is designated by the user through the reception device 52, but a configuration may be adopted in which the CPU 58 sets the virtual viewpoint according to the scene such as the bird's-eye view video 46A. That is, the CPU 58 may acquire viewpoint information regarding at least one virtual viewpoint set on the basis of at least one motion picture data among the plurality of motion picture data. Also in this case, it is possible to obtain the virtual viewpoint video using the virtual viewpoint intended by the user as a reference, as in the above embodiment.

The soccer stadium 22 has been described as an example in the above embodiment, but the soccer stadium 22 is merely an example, and any place may be used as long as a plurality of imaging devices can be installed as in a baseball field, a rugby field, a curling field, an athletic field, a swimming field, a concert hall, an outdoor music field, a theater venue, and the like.

Further, the wireless communication method using the base station 20 has been described as an example in the above embodiment, but the wireless communication method is merely an example, and the technique of the present disclosure is established even with the wired communication method using a cable.

Further, the unmanned aerial vehicle 27 has been described as an example in the above embodiment, but the technique of the present disclosure is not limited thereto, and the imaging region may be imaged by the imaging device 18 suspended by a wire (for example, a self-propelled imaging device that is movable along the wire).

Further, the computers 50 and 70 have been described as an example in the above embodiment, but the technique of the present disclosure is not limited thereto. For example, a device including an ASIC, an FPGA, and/or a PLD may be applied instead of the computers 50 and/or 70. Alternatively, a combination of a hardware configuration and a software configuration may be used instead of the computers 50 and/or 70.

Figure 27:
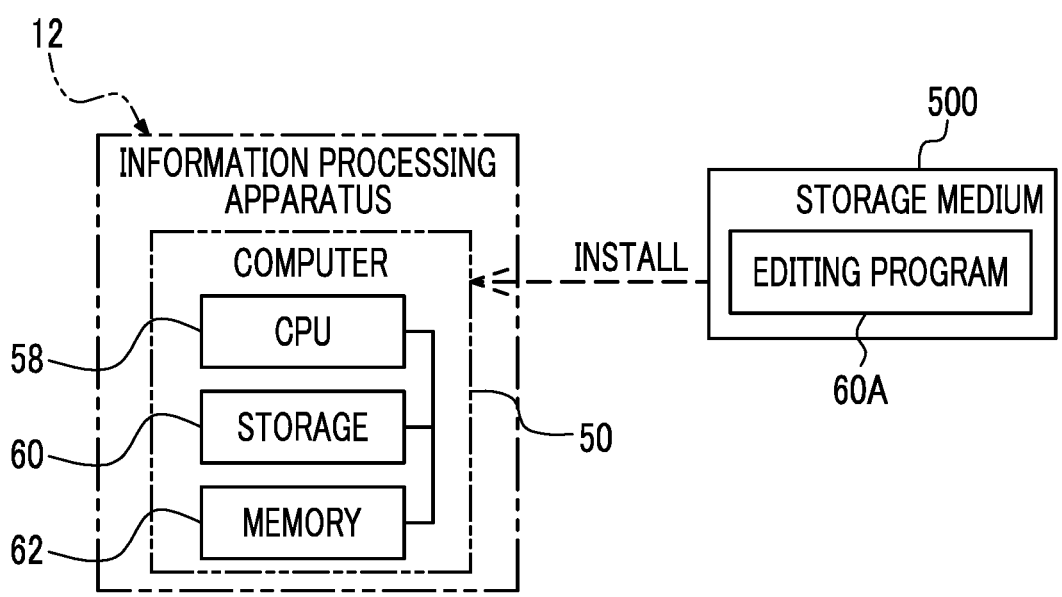
FIG. 27 is a block diagram showing an example of an aspect in which a program is installed from a storage medium onto a computer of the information processing apparatus.

Further, the storage 60 stores the editing program 60A in the above embodiment, but the technique of the present disclosure is not limited thereto, and any portable storage medium 500, such as an SSD or a USB memory, may store the editing program 60A as shown in FIG. 27 as an example. In this case, the editing program 60A stored in the storage medium 500 is installed on the computer 50, and the CPU 58 executes information processing (for example, virtual viewpoint designation processing, virtual viewpoint video generation processing, quality determination processing, presentation processing, and editing processing) in accordance with the editing program 60A.

Alternatively, the editing program 60A may be stored in a storage unit of, for example, another computer or a server device connected to the computer 50 through the communication network (not shown), and the editing program 60A may be downloaded on the information processing apparatus 12 in response to a request from the information processing apparatus 12. In this case, information processing based on the downloaded editing program 60A is executed by the CPU 58 of the computer 50.

Further, the CPU 58 has been described as an example in the above embodiment, but the technique of the present disclosure is not limited thereto, and a GPU may be adopted. Alternatively, a plurality of CPUs or a combination of a CPU and a GPU may be adopted instead of the CPU 58. That is, the information processing may be executed by one processor or a plurality of physically separated processors. Further, a GPU may be adopted instead of the CPU 88, or a plurality of CPUs or a combination of a CPU and a GPU may be adopted, or various kinds of processing may be executed by one processor or a plurality of physically separated processors.

As a hardware resource for executing the information processing, various processors shown below can be used. Examples of the processor include, as described above, a CPU, which is a general-purpose processor that functions as the hardware resource for executing the information processing in accordance with software, that is, the program. Examples of another processor include a dedicated electric circuit, which is a processor having a dedicated circuit configuration designed to execute specific processing, such as an FPGA, a PLD, or an ASIC. A memory is incorporated in or connected to any processor, and any processor executes the information processing using the memory.

The hardware resource for executing the information processing may be constituted of one of these various processors, or a combination of two or more processors of the same type or different types (for example, a combination of a plurality of FPGAs, or a combination of a CPU and an FPGA). Alternatively, the hardware resource for executing the information processing may be one processor.

A first example in which the hardware resource for executing the information processing is constituted of one processor is an aspect in which one or more CPUs and software are combined to constitute one processor and the processor functions as the hardware resource for executing the information processing. The aspect is typified by a computer such as a client and a server. A second example is an aspect in which a processor that realizes all the functions of a system including a plurality of hardware resources for executing the information processing with one IC chip is used. The aspect is typified by an SoC or the like. As described above, the information processing is realized by using one or more of the above-described various processors as a hardware resource.

Further, more specifically, electric circuitry in which circuit elements such as semiconductor elements are combined can be used as the hardware structure of these various processors. Furthermore, the technique of the present disclosure extends to a program and a storage medium on which the program is stored in a non-transitory manner.

In addition, the above-mentioned information processing is merely an example. Accordingly, it goes without saying that unnecessary steps may be deleted, new steps may be added, or the processing order may be rearranged without departing from the gist.

The contents described and shown above are detailed descriptions for parts related to the technique of the present disclosure, and are merely an example of the technique of the present disclosure. For example, the description of the configurations, functions, operations, and effects is the description of an example of the configurations, functions, operations, and effects of parts related to the technique of the present disclosure. Therefore, it goes without saying that unnecessary elements may be deleted, new elements may be added, or the replacements may be made for the contents described and shown above without departing from the gist of the technique of the present disclosure. In addition, in order to avoid complications and facilitate understanding of the parts related to the technique of the present disclosure, in the contents described and shown above, descriptions of common general knowledge and the like that do not require special descriptions for enabling the implementation of the technique of the present disclosure are omitted.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An information processing apparatus comprising:
a display;
a processor; and
a memory that is connected to or incorporated in the processor,
wherein the processor
acquires viewpoint information regarding at least one virtual viewpoint, and
presents quality information indicating a quality of a virtual viewpoint video that is created with the viewpoint information as a reference, on the basis of a plurality of motion picture data obtained by being captured by a plurality of imaging devices, wherein the processor presents the quality information indicating the quality of the virtual viewpoint video by displaying, on the display, at least one time slot in which a quality of the virtual viewpoint video within the at least one time slot satisfies a predetermined condition.

2. The information processing apparatus according to claim 1,
wherein the processor presents the quality information in association with a period of imaging performed by the plurality of imaging devices.

3. The information processing apparatus according to claim 1,
wherein the viewpoint information includes a position, a line-of-sight direction, and an angle of view of the virtual viewpoint,
the quality is a value related to a proportion of an occlusion region of a specific subject included in a visual field range decided by the viewpoint information, and
the processor determines that the smaller the proportion of the occlusion region is, the higher the quality is.

4. The information processing apparatus according to claim 3,
wherein the processor changes a presentation mode according to the proportion of the occlusion region.

5. The information processing apparatus according to claim 4,
wherein the presentation mode is a mode displayed by control of the display performed by the processor.

6. The information processing apparatus according to claim 1,
wherein the viewpoint information includes a position, a line-of-sight direction, and an angle of view of the virtual viewpoint,
the quality is a value related to the number of pixels of or a degree of focusing on a specific subject included in a visual field range decided by the viewpoint information, and
the processor determines that the greater the number of pixels is or the higher the degree of focusing is, the higher the quality is.

7. The information processing apparatus according to claim 1,
wherein the processor
presents at least one of a time slot in which the quality is a threshold value or more or a time slot in which the quality is less than the threshold value, as the quality information.

8. The information processing apparatus according to claim 7,
wherein the processor
distinguishes and presents the time slot in which the quality is the threshold value or more and the time slot in which the quality is less than the threshold value, as the quality information.

9. The information processing apparatus according to claim 7,
wherein the processor
changes the threshold value according to a reproduction speed of a motion picture file created by editing the virtual viewpoint video.

10. The information processing apparatus according to claim 9,
wherein the processor lowers the threshold value as the reproduction speed increases.

11. The information processing apparatus according to claim 7,
wherein the processor
has a plurality of the threshold values, and
presents at least one of the time slot in which the quality is the threshold value or more or the time slot in which the quality is less than the threshold value, for each threshold value.

12. The information processing apparatus according to claim 1,
wherein the viewpoint information includes a plurality of virtual viewpoints, and
the processor presents the quality information for each virtual viewpoint.

13. The information processing apparatus according to claim 1,
wherein the viewpoint information includes a trajectory indicating a temporal movement of one virtual viewpoint, and
the processor
presents quality information indicating a quality of a virtual viewpoint video that is created from a position of each virtual viewpoint constituting the trajectory.

14. The information processing apparatus according to claim 1,
wherein the processor
acquires viewpoint information regarding at least one virtual viewpoint designated by a reception device.

15. The information processing apparatus according to claim 1,
wherein the processor
acquires viewpoint information regarding at least one virtual viewpoint set on the basis of at least one motion picture data among the plurality of motion picture data.

16. An information processing method comprising:
acquiring viewpoint information regarding at least one virtual viewpoint; and
presenting quality information indicating a quality of a virtual viewpoint video that is created with the viewpoint information as a reference, on the basis of a plurality of motion picture data obtained by being captured by a plurality of imaging devices, wherein presenting the quality information indicating the quality of the virtual viewpoint video comprises displaying, on a display, at least one time slot in which a quality of the virtual viewpoint video within the at least one time slot satisfies a predetermined condition.

17. A non-transitory computer-readable storage medium storing a program for causing a computer to execute a process comprising:
acquiring viewpoint information regarding at least one virtual viewpoint; and
presenting quality information indicating a quality of a virtual viewpoint video that is created with the viewpoint information as a reference, on the basis of a plurality of motion picture data obtained by being captured by a plurality of imaging devices, wherein presenting the quality information indicating the quality of the virtual viewpoint video comprises displaying, on a display, at least one time slot in which a quality of the virtual viewpoint video within the at least one time slot satisfies a predetermined condition.

* * * * *